United States Patent
Yoshikawa et al.

(10) Patent No.: US 12,518,525 B2
(45) Date of Patent: Jan. 6, 2026

(54) CONTROL SYSTEM, CONTROL METHOD, AND STORAGE MEDIUM

(71) Applicant: TOYOTA JIDOSHA KABUSHIKI KAISHA, Toyota (JP)

(72) Inventors: Kei Yoshikawa, Nagoya (JP); Shiro Oda, Anjo (JP); Susumu Shimizu, Tokyo (JP); Takeshi Matsui, Nissin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 451 days.

(21) Appl. No.: 18/122,419

(22) Filed: Mar. 16, 2023

(65) Prior Publication Data
US 2023/0368517 A1 Nov. 16, 2023

(30) Foreign Application Priority Data
May 12, 2022 (JP) ................. 2022-078600

(51) Int. Cl.
*G06V 10/764* (2022.01)
*G06V 10/147* (2022.01)
*G06V 10/70* (2022.01)
*G06V 40/10* (2022.01)

(52) U.S. Cl.
CPC ............ *G06V 10/87* (2022.01); *G06V 10/147* (2022.01); *G06V 10/764* (2022.01); *G06V 40/10* (2022.01)

(58) Field of Classification Search
CPC .... G06V 10/87; G06V 10/147; G06V 10/764; G06V 40/10
See application file for complete search history.

(56) References Cited

U.S. PATENT DOCUMENTS

| | | | |
|---|---|---|---|
| 11,409,304 B1* | 8/2022 | Cai | B60W 30/095 |
| 11,657,634 B2* | 5/2023 | Takai | G06V 10/50 |
| | | | 701/25 |
| 2001/0056544 A1* | 12/2001 | Walker | B60R 25/102 |
| | | | 180/170 |
| 2017/0357256 A1* | 12/2017 | Mizutani | G05D 1/0027 |
| 2018/0137119 A1* | 5/2018 | Li | H04N 23/63 |

(Continued)

FOREIGN PATENT DOCUMENTS

| | | |
|---|---|---|
| JP | 2021-084199 A | 6/2021 |
| JP | 2021086199 A | 6/2021 |

*Primary Examiner* — Shaghayegh Azima
(74) *Attorney, Agent, or Firm* — Dinsmore & Shohl LLP

(57) ABSTRACT

A control system according to the present disclosure executes system control that controls a system including a mobile robot that autonomously moves. The control system executes a group classification process of recognizing a feature of a person present around the mobile robot and classifying, based on the feature, the person into a preset first group or second group. The control system above selects a first operation mode when the person belonging to the first group is present around the mobile robot and selects a second operation mode that is different from the first operation mode when the person belonging to the first group is not present around the mobile robot. The control system above controls, when the second operation mode is selected, the group classification process so as to execute a process with a smaller processing load than a processing load when the first operation mode is selected.

17 Claims, 10 Drawing Sheets

(56) References Cited

U.S. PATENT DOCUMENTS

| | | | |
|---|---|---|---|
| 2018/0364045 A1* | 12/2018 | Williams | G01S 17/88 |
| 2020/0053324 A1* | 2/2020 | Deyle | G01C 21/20 |
| 2020/0273345 A1* | 8/2020 | Mangal | G06Q 50/40 |
| 2020/0394474 A1* | 12/2020 | Vallespi-Gonzalez | ............... |
| | | | G06F 18/214 |
| 2021/0110716 A1* | 4/2021 | Becker | B60W 30/085 |
| 2021/0157318 A1* | 5/2021 | Takai | G05D 1/0223 |
| 2022/0261601 A1* | 8/2022 | Amato | G06F 18/24323 |
| 2022/0308592 A1* | 9/2022 | Go | G05D 1/0214 |
| 2022/0379471 A1* | 12/2022 | Higuchi | B25J 9/1676 |
| 2023/0356411 A1 | 11/2023 | Ouchi et al. | |

\* cited by examiner

FIG. 5

| CATEGORY | CLOTHING COLOR | GROUP CLASSIFICATION |
|---|---|---|
| NON-STAFF PERSON | UNSPECIFIED | FIRST GROUP |
| PHARMACIST | YELLOW | SECOND GROUP |
| NURSE | PURPLE | |
| ⋮ | ⋮ | |

FIG. 6

|  | NON-STAFF MODE | STAFF-MODE |
|---|---|---|
| CAMERA SERVING AS INFORMATION SOURCE OF IMAGE DATA TO BE USED FOR GROUP CLASSIFICATION | ENVIRONMENTAL CAMERAS AND CAMERAS OF MOBILE ROBOT | ENVIRONMENTAL CAMERAS |
| LEARNED MODEL | FIRST LEARNED MODEL | SECOND LEARNED MODEL |

CONTROL SYSTEM, CONTROL METHOD, AND STORAGE MEDIUM

CROSS-REFERENCE TO RELATED APPLICATION

This application claims priority to Japanese Patent Application No. 2022-078600 filed on May 12, 2022, incorporated herein by reference in its entirety.

BACKGROUND

1. Technical Field

The present disclosure relates to a control system, a control method, and a storage medium.

2. Description of Related Art

Japanese Unexamined Patent Application Publication No. 2021-86199 (JP 2021-86199 A) discloses a control system that controls a mobile robot that moves within a facility.

SUMMARY

When a mobile robot is used in an environment where people are present, there are situations where there are people (patients, visitors, etc.) who are unfamiliar with the mobile robot, such as when the mobile robot is used in hospital facilities, and where there are no such people and there are only people who are familiar with the mobile robot (hospital staff members). However, in such an environment, when human recognition is performed without distinguishing such people in any situation, a certain level of processing load is constantly applied all the time.

Therefore, when a mobile robot is used in an environment where people are present, it is desirable to reduce power consumption by changing the processing load depending on situations. Note that such an issue cannot be solved by the technique described in JP 2021-86199 A.

The present disclosure has been made to solve the issue above, and provides a control system, a control method, and a storage medium capable of flexibly changing a processing load depending on situations and reducing power consumption when a system including a mobile robot that autonomously moves is controlled.

A control system according to the present disclosure executes system control that controls a system including a mobile robot that autonomously moves, and executes a group classification process of recognizing a feature of a person present around the mobile robot and classifying, based on the feature, the person into a first group or a second group that is preset. The system control selects a first operation mode when the person belonging to the first group is present around the mobile robot and selects a second operation mode that is different from the first operation mode when the person belonging to the first group is not present around the mobile robot, and controls, when the second operation mode is selected, the group classification process so as to execute a process with a smaller processing load than a processing load when the first operation mode is selected. Accordingly, when the system including the mobile robot that autonomously moves is controlled, the processing load can be flexibly changed depending on situations, and the power consumption can be reduced.

The group classification process may be executed using any one of a first learned model or a second learned model with a smaller processing load than a processing load of the first learned model. The system control may control the group classification process so as to use the first learned model when the first operation mode is selected and so as to use the second learned model when the second operation mode is selected. Accordingly, when the system including the mobile robot that autonomously moves is controlled, the processing load related to the group classification can be flexibly changed depending on situations, and the power consumption can be reduced.

When the second operation mode is selected, the system control may control the group classification process so as to lower at least one of a processing accuracy and a usage ratio of a processing device to be used in the group classification process as compared with when the first operation mode is selected. Accordingly, when the system including the mobile robot that autonomously moves is controlled, the processing load related to the group classification can be flexibly changed depending on situations, and the power consumption can be reduced.

A camera that captures an image of surroundings of the mobile robot and generates moving image data may be provided as one of the processing devices. The group classification process may recognize the feature of the person from the moving image data generated by the camera. The system control may control the group classification process so as to lower at least one of a frame rate and resolution of the camera when the second operation mode is selected as compared with when the first operation mode is selected. Accordingly, when the system including the mobile robot that autonomously moves is controlled, the processing load of the camera related to the group classification can be flexibly changed depending on situations, and the power consumption can be reduced.

The camera may be provided at a position spaced apart from a traveling surface of the mobile robot so as to capture the image of the surroundings of the mobile robot that is traveling. Accordingly, when the system including the mobile robot that autonomously moves is controlled, the processing load of the camera that is related to the group classification, the camera being installed in the surroundings, can be flexibly changed depending on situations, the power consumption can be reduced, and further, the mobile robot can be monitored.

The group classification process may classify the person in accordance with a feature of closing of the person or in accordance with whether the person possesses a predetermined belonging. This makes it possible to easily classify the person.

The system control may vary movement control of the mobile robot depending on which one of the first operation mode and the second operation mode is selected. Accordingly, when the system including the mobile robot that autonomously moves is controlled, the movement control of the mobile robot can be flexibly changed depending on situations.

A control method according to the present disclosure includes: executing system control that controls a system including a mobile robot that autonomously moves; and executing a group classification process of recognizing a feature of a person present around the mobile robot and classifying, based on the feature, the person into a first group or a second group that is preset. The system control selects a first operation mode when the person belonging to the first group is present around the mobile robot and selects a second operation mode that is different from the first operation mode when the person belonging to the first group is not present around the mobile robot, and controls, when the second operation mode is selected, the group classification process so as to execute a process with a smaller processing load than a processing load when the first operation mode is selected. Accordingly, when the system including the mobile robot that autonomously moves is controlled, the processing load can be flexibly changed depending on situations, and the power consumption can be reduced.

The group classification process may be executed using any one of a first learned model or a second learned model with a smaller processing load than a processing load of the first learned model. The system control may control the group classification process so as to use the first learned model when the first operation mode is selected and so as to use the second learned model when the second operation mode is selected. Accordingly, when the system including the mobile robot that autonomously moves is controlled, the processing load related to the group classification can be flexibly changed depending on situations, and the power consumption can be reduced.

When the second operation mode is selected, the system control may control the group classification process so as to lower at least one of a processing accuracy and a usage ratio of a processing device to be used in the group classification process as compared with when the first operation mode is selected. Accordingly, when the system including the mobile robot that autonomously moves is controlled, the processing load related to the group classification can be flexibly changed depending on situations, and the power consumption can be reduced.

A camera that captures an image of surroundings of the mobile robot and generates moving image data may be provided as one of the processing devices. The group classification process may recognize the feature of the person from the moving image data generated by the camera. The system control may control the group classification process so as to lower at least one of a frame rate and resolution of the camera when the second operation mode is selected as compared with when the first operation mode is selected. Accordingly, when the system including the mobile robot that autonomously moves is controlled, the processing load of the camera related to the group classification can be flexibly changed depending on situations, and the power consumption can be reduced.

The camera may be provided at a position spaced apart from a traveling surface of the mobile robot so as to capture the image of the surroundings of the mobile robot that is traveling. Accordingly, when the system including the mobile robot that autonomously moves is controlled, the processing load of the camera that is related to the group classification, the camera being installed in the surroundings, can be flexibly changed depending on situations, the power consumption can be reduced, and further, the mobile robot can be monitored.

The group classification process may classify the person in accordance with a feature of closing of the person or in accordance with whether the person possesses a predetermined belonging. This makes it possible to easily classify the person.

The system control may vary movement control of the mobile robot depending on which one of the first operation mode and the second operation mode is selected. Accordingly, when the system including the mobile robot that autonomously moves is controlled, the movement control of the mobile robot can be flexibly changed depending on situations.

A storage medium according to the present disclosure stores a program for causing a computer to execute a control method. The control method executes system control that controls a system including a mobile robot that autonomously moves, and executes a group classification process of recognizing a feature of a person present around the mobile robot and classifying, based on the feature, the person into a first group or a second group that is preset. The system control selects a first operation mode when the person belonging to the first group is present around the mobile robot and selects a second operation mode that is different from the first operation mode when the person belonging to the first group is not present around the mobile robot, and controls, when the second operation mode is selected, the group classification process so as to execute a process with a smaller processing load than a processing load when the first operation mode is selected. Accordingly, when the system including the mobile robot that autonomously moves is controlled, the processing load can be flexibly changed depending on situations, and the power consumption can be reduced.

The group classification process may be executed using any one of a first learned model or a second learned model with a smaller processing load than a processing load of the first learned model. The system control may control the group classification process so as to use the first learned model when the first operation mode is selected and so as to use the second learned model when the second operation mode is selected. Accordingly, when the system including the mobile robot that autonomously moves is controlled, the processing load related to the group classification can be flexibly changed depending on situations, and the power consumption can be reduced.

When the second operation mode is selected, the system control may control the group classification process so as to lower at least one of a processing accuracy and a usage ratio of a processing device to be used in the group classification process as compared with when the first operation mode is selected. Accordingly, when the system including the mobile robot that autonomously moves is controlled, the processing load related to the group classification can be flexibly changed depending on situations, and the power consumption can be reduced.

A camera that captures an image of surroundings of the mobile robot and generates moving image data may be provided as one of the processing devices. The group classification process may recognize the feature of the person from the moving image data generated by the camera. The system control may control the group classification process so as to lower at least one of a frame rate and resolution of the camera when the second operation mode is selected as compared with when the first operation mode is selected. Accordingly, when the system including the mobile robot that autonomously moves is controlled, the processing load of the camera related to the group classification can be flexibly changed depending on situations, and the power consumption can be reduced.

The camera may be provided at a position spaced apart from a traveling surface of the mobile robot so as to capture the image of the surroundings of the mobile robot that is traveling. Accordingly, when the system including the mobile robot that autonomously moves is controlled, the processing load of the camera that is related to the group classification, the camera being installed in the surroundings, can be flexibly changed depending on situations, the power consumption can be reduced, and further, the mobile robot can be monitored.

The group classification process may classify the person in accordance with a feature of closing of the person or in accordance with whether the person possesses a predetermined belonging. This makes it possible to easily classify the person.

The system control may vary movement control of the mobile robot depending on which one of the first operation mode and the second operation mode is selected. Accordingly, when the system including the mobile robot that autonomously moves is controlled, the movement control of the mobile robot can be flexibly changed depending on situations.

The present disclosure can provide a control system, a control method, and a storage medium capable of flexibly changing a processing load depending on situations and reducing power consumption when a system including a mobile robot that autonomously moves is controlled.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a table for illustrating an example of staff information;

FIG. 6 is a table for illustrating an example of mode information;

DETAILED DESCRIPTION OF EMBODIMENTS

Hereinafter, the present disclosure will be described through embodiments of the disclosure. However, the disclosure according to the claims is not limited to the following embodiments. Moreover, all of the configurations described in the embodiments are not necessarily indispensable as means for solving the issue.

Schematic Configuration

A control system according to the present embodiment is a system capable of executing system control for controlling a system including a mobile robot that autonomously moves, executing a group classification process for classifying people, and executing system control based on results of the group classification process. The system control can be executed by a system control unit provided in the control system, and the group classification process can be executed by a group classification unit provided in the control system.

The group classification process can be executed, for example, for the purpose of monitoring a person himself/herself, or can be executed for the purpose of monitoring the person for controlling a route change of the mobile robot. In other words, the control system according to the present embodiment can be a system capable of executing the group classification process for classifying people, and monitoring the people themselves or controlling the route change of the mobile robot in accordance with to the monitoring results of people. Further, the purpose of the group classification process can be monitoring of people for controlling equipment such as lighting equipment and air conditioning equipment in the above area, and the control system can be a system that controls the equipment in accordance with the monitoring results of people. Also, the purpose of the group classification process is not limited to the above. As a matter of course, the group classification process can also be executed for multiple purposes.

Figure 1:
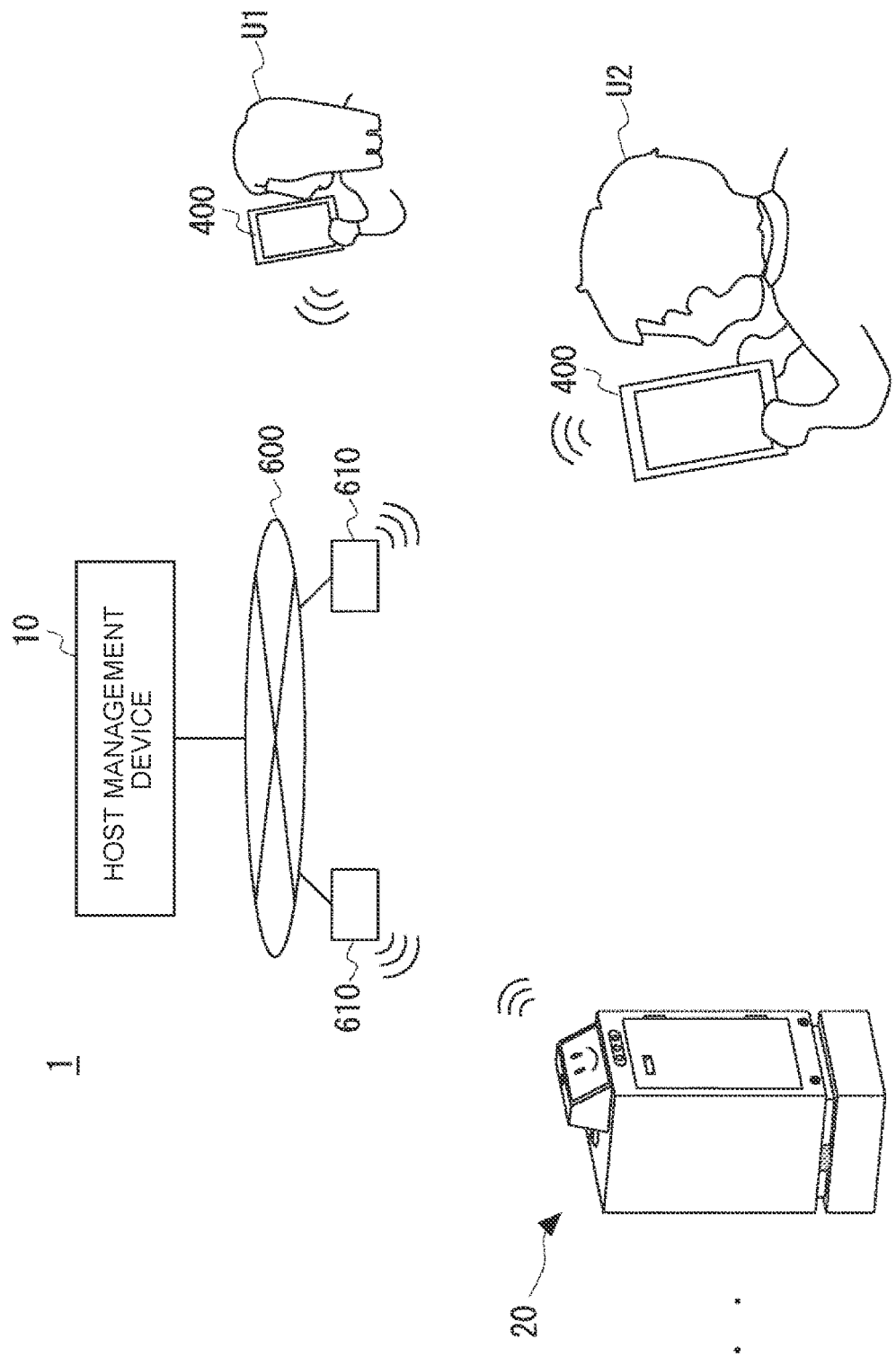
FIG. 1 is a conceptual diagram for illustrating an example of the overall configuration of a transport system that uses a mobile robot and that can incorporate a control system according to the present embodiment.

First, an example of a transport system that uses a mobile robot and that can incorporate the control system according to the present embodiment will be described. FIG. 1 is a conceptual diagram for illustrating an example of the overall configuration of a transport system 1 that uses a mobile robot 20 and that can incorporate a control system according to the present embodiment. The mobile robot 20 is, for example, a transport robot that executes a task of transporting a transported object. In the following description, an example of a transport robot will be given, but the mobile robot 20 can also be a mobile robot for other purposes.

The mobile robot 20 autonomously travels to transport the transported object in a predetermined area, for example, a medical welfare facility such as a hospital, a rehabilitation center, a nursing facility, and an elderly care facility. Although the description will be made with the transport system according to the present embodiment as a system in which the transport robot autonomously moves within a hospital, the transport system described above can be used to transport luggage in hotels, restaurants, office buildings, event venues, commercial facilities such as shopping malls, other complex facilities and the like. Further, the above-described predetermined area that is a movement range of the mobile robot 20 can be set in advance as part of the facility or the entire facility where the mobile robot 20 is used, or a surrounding area including the facility. In the following, for the sake of simplification of description, an example in which the predetermined area is inside the facility will be described. However, the mobile robot 20 does not have to have its movement range set, and may be any mobile robot that can move autonomously.

A user U1 stores the transported object in the mobile robot 20 and requests transportation. The mobile robot 20 autonomously moves to the set destination to transport the transported object. That is, the mobile robot 20 executes a luggage transport task (hereinafter also simply referred to as a task). In the following description, the location where the transported object is loaded is referred to as a transport source, and the location where the transported object is delivered is referred to as a transport destination.

For example, it is assumed that the mobile robot 20 moves in a general hospital having a plurality of clinical departments. The mobile robot 20 transports equipment, consumables, medical equipment, and the like between the clinical departments. For example, the mobile robot 20 delivers the transported object from a nurse station of one clinical department to a nurse station of another clinical department. Alternatively, the mobile robot 20 delivers the transported object from the storage of the equipment and the medical equipment to the nurse station of the clinical department. The mobile robot 20 also delivers medicine dispensed in the dispensing department to the clinical department or a patient that is scheduled to use the medicine.

Examples of the transported object include medicines, consumables such as bandages, specimens, testing instruments, medical equipment, hospital food, and equipment such as stationery. The medical equipment includes sphygmomanometers, blood transfusion pumps, syringe pumps, foot pumps, nurse call buttons, bed leaving sensors, low-pressure continuous inhalers, electrocardiogram monitors, drug injection controllers, enteral nutrition pumps, artificial respirators, cuff pressure gauges, touch sensors, aspirators, nebulizers, pulse oximeters, artificial resuscitators, aseptic devices, echo machines, and the like. Meals such as hospital food and inspection meals may also be transported. Further, the mobile robot 20 may transport used equipment, tableware that have been used during meals, and the like. When the transport destination is on a different floor, the mobile robot 20 may move using an elevator or the like.

The transport system 1 includes a mobile robot 20, a host management device 10, a network 600, a communication unit 610, and user terminals 400. The user U1 or the user U2 can make a transport request for the transported object using the user terminal 400. For example, the user terminal 400 is a tablet computer, smart phone, or the like. The user terminal 400 only needs to be an information processing device capable of wireless or wired communication.

In the present embodiment, the mobile robot 20 and the user terminals 400 are connected to the host management device 10 via the network 600. The mobile robot 20 and the user terminals 400 are connected to the network 600 via the communication unit 610. The network 600 is a wired or wireless local area network (LAN) or wide area network (WAN). The host management device 10 is connected to the network 600 by wire or wirelessly. The communication unit 610 is, for example, a wireless LAN unit installed in each environment. The communication unit 610 may be a general-purpose communication device such as a WiFi (registered trademark) router.

Various signals transmitted from the user terminals 400 of the users U1 and U2 are once sent to the host management device 10 via the network 600, and transmitted from the host management device 10 to the target mobile robot 20. Similarly, various signals transmitted from the mobile robot 20 are once sent to the host management device 10 via the network 600, and transmitted from the host management device 10 to the target user terminal 400. The host management device 10 is a server connected to each equipment, and collects data from each equipment. The host management device 10 is not limited to a physically single device, and may include a plurality of devices that performs distributed processing. Further, the host management device 10 may be distributedly provided in an edge device such as the mobile robot 20. For example, part of the transport system 1 or the entire transport system 1 may be installed in the mobile robot 20.

The user terminal 400 and the mobile robot 20 may transmit and receive signals without the host management device 10. For example, the user terminal 400 and the mobile robot 20 may directly transmit and receive signals by wireless communication. Alternatively, the user terminal 400 and the mobile robot 20 may transmit and receive signals via the communication unit 610.

The user U1 or the user U2 requests the transportation of the transported object using the user terminal 400. Hereinafter, the description is made assuming that the user U1 is the transport requester at the transport source and the user U2 is the planned recipient at the transport destination (destination). Needless to say, the user U2 at the transport destination can also make a transport request. Further, a user who is located at a location other than the transport source or the transport destination may make a transport request.

When the user U1 makes a transport request, the user U1 inputs, using the user terminal 400, the content of the transported object, the receiving point of the transported object (hereinafter also referred to as the transport source), the delivery destination of the transported object (hereinafter also referred to as the transport destination), the estimated arrival time at the transport source (the receiving time of the transported object), the estimated arrival time at the transport destination (the transport deadline), and the like. Hereinafter, these types of information are also referred to as transport request information. The user U1 can input the transport request information by operating the touch panel of the user terminal 400. The transport source may be a location where the user U1 is present, a storage location for the transported object, or the like. The transport destination is a location where the user U2 or a patient who is scheduled to use the transported object is present.

The user terminal 400 transmits the transport request information input by the user U1 to the host management device 10. The host management device 10 is a management system that manages a plurality of the mobile robots 20. The host management device 10 transmits an operation command for executing a transport task to the mobile robot 20. The host management device 10 determines the mobile robot 20 that executes the transport task for each transport request. The host management device 10 transmits a control signal including an operation command to the mobile robot 20. The mobile robot 20 moves from the transport source so as to arrive at the transport destination in accordance with the operation command.

For example, the host management device 10 assigns a transport task to the mobile robot 20 at or near the transport source. Alternatively, the host management device 10 assigns a transport task to the mobile robot 20 heading toward the transport source or its vicinity. The mobile robot 20 to which the task is assigned travels to the transport source to pick up the transported object. The transport source is, for example, a location where the user U1 who has requested the task is present.

When the mobile robot 20 arrives at the transport source, the user U1 or another staff member loads the transported object on the mobile robot 20. The mobile robot 20 on which the transported object is loaded autonomously moves with the transport destination set as the destination. The host management device 10 transmits a signal to the user terminal 400 of the user U2 at the transport destination. Thus, the user U2 can recognize that the transported object is being transported and the estimated arrival time. When the mobile robot 20 arrives at the set transport destination, the user U2 can receive the transported object stored in the mobile robot 20. As described above, the mobile robot 20 executes the transport task.

In the overall configuration described above, each element of a robot control system relating to the control of the mobile robot 20 in the transport system 1 can be distributed to the mobile robot 20, the user terminal 400, and the host management device 10 to construct the robot control system. Also, the elements of the robot control system, that is, the substantial elements for realizing the transportation of the transported object by the mobile robot 20 can be assembled into one device to construct the robot control system. The host management device 10 capable of functioning as the device above controls one or more mobile robots 20.

The mobile robot 20 used in the transport system 1 can be a mobile robot that moves autonomously with reference to a map. The robot control system that controls the mobile robot 20 acquires distance information indicating the distance to a person measured using a ranging sensor, for example. The robot control system estimates a movement vector indicating a moving speed and a moving direction of the person in accordance with a change of the distance to the person. The robot control system imposes a cost on the map to limit the movement of the mobile robot 20. The robot control system controls the mobile robot 20 to move corresponding to the cost updated in accordance with the measurement result of the ranging sensor. The robot control system may be installed in the mobile robot 20, or part of the robot control system or the entire robot control system may be installed in the host management device 10. However, in the present embodiment, the control method of the mobile robot 20 in the robot control system may be any method.

The control system according to the present embodiment can be incorporated into the transport system 1 together with such a robot control system or as an independent system. Elements of such a control system, that is, elements of a control system for controlling the system including the mobile robot 20, can be constructed distributedly in the mobile robot 20, the user terminal 400, and the host management device 10, or can be assembled and constructed in one device. In the following example, the description will be made with the example in which the host management device 10 as an example of the device above includes the elements of the control system, that is, the host management device 10 executes the system control and the group classification process, in other words, the host management device 10 includes the system control unit and the group classification unit.

The system control unit controls the system including the mobile robot 20 that moves autonomously. The mobile robot 20 can be a mobile robot that autonomously moves in a preset area such as a part or the entire area of the above-described map or an area indicated by latitude and longitude. However, the mobile robot 20 can be configured to be able to move autonomously while sensing its surroundings even outside the preset area, outside the entire area included in the map in the first place, or even in a mode in which the movement range is not set, for example. Further, the system to be controlled includes the robot control system, and may also include equipment such as a plurality of cameras (hereinafter, an example will be given with environmental cameras) installed in the facility.

The group classification unit recognizes the features of people who are present around the mobile robot 20 and executes the group classification process for classifying the people into a preset first group or second group based on the recognized features. Although the description will be made as the first group is a non-staff group and the second group is a staff group in the present embodiment, the classification of people can also be implemented based on various other attributes. It should be noted that the mobile robot 20 and other mobile robots having the same or different functions can also be recognized, and in that case, the mobile robots such as the mobile robot 20 can be classified as the staff members.

An image of the person can be captured by environmental cameras, a camera mounted on the mobile robot 20, or both, and the features of the person are recognized based on the obtained image data. When the camera mounted on the mobile robot 20 is used, cameras mounted on all or some of the mobile robots 20 present in the facility can be used. In the latter case, the camera mounted on the mobile robot 20 that is designated in advance, or the camera mounted on the mobile robot 20 that satisfies predetermined condition can be used. The predetermined condition for the mobile robot 20 that satisfies the condition may be any predetermined condition, such as the condition that, when the distance between the adjacent mobile robots 20 is within a predetermined value, only one of the mobile robots 20 is selected.

Further, the group classification unit can perform classification by matching an image of the staff member (for example, a facial image) that is stored in advance with an image of a person captured by at least one of the environmental cameras and the camera mounted on the mobile robot 20 as described above. Any recognition method (detection method, extraction method) of the features of the person for classification may be used. Also, the group classification unit can perform classification using, for example a learned model that is machine-learned.

Further, the group classification unit may classify the person in accordance with, for example, the features of the person's clothing, or in accordance with whether the person possesses a predetermined belonging. This makes it possible to easily classify the person. As a matter of course, even when such a classification method is adopted, classification can also be performed using a learned model that is machine-learned.

As described above, the group classification unit recognizes the features of the people present around the mobile robot 20. This is to determine whether there are people belonging to non-staff persons around the mobile robot 20. Here, an area "around the mobile robot 20" can be classified based on the distance, such as within a predetermined distance from the mobile robot 20. Alternatively, when the facility is managed by dividing the facility into a plurality of blocks such as rooms and corridors, the area "around the mobile robot 20" may also refer to the inside of the block where the mobile robot 20 is present. Alternatively, the area "around the mobile robot 20" can be defined to refer to all of the above-described predetermined areas exemplified within the facility. Also, the area "around the mobile robots 20" can be the area around all or part of the mobile robots 20 present in the facility, and various examples described above can be applied to the area around each mobile robot 20 in this case.

The non-staff person and the staff member will be described. Facility users include staff members working at the facility and other non-staff persons. Here, when the facility is a hospital, the non-staff persons include patients, inpatients, visitors, outpatients, attendants, and the like. The staff members include doctors, nurses, pharmacists, clerks, occupational therapists, and other employees. Further, the staff members may also include people carrying various items, maintenance workers, cleaners, and the like. The staff members are not limited to direct employers or employees of the hospital, but may include affiliated employees.

The control system is desired to reduce power consumption in an environment such as a hospital where both the staff members and the non-staff persons are mixedly present as the recognition target. Therefore, the host management device 10 needs to control the system including the mobile robot 20 while appropriately reducing power consumption depending on situations, that is, in accordance with the presence status of people in the facility.

Specifically, the system control unit of the host management device 10 selects a first operation mode when a person belonging to the non-staff person is present around the mobile robot 20. On the other hand, the system control unit selects a second operation mode different from the first operation mode when no person belonging to the non-staff person is present around the mobile robot 20. Hereinafter, a description will be made with the first operation mode referred to as a non-staff mode and the second operation mode referred to as a staff mode. However, as described in the classification of the first group and the second group, the classification can also be performed based on other attributes.

For example, when the system control unit recognizes that no person belonging to the non-staff person is present while the non-staff mode is selected, the system control unit can switch the mode to the staff mode. On the contrary, when the system control unit recognizes that a person belonging to the non-staff person is present while the staff mode is selected, the system control unit can switch the mode to the non-staff mode. Although it is merely an example, the staff mode is selected in a situation where there are no people other than the users U1 and U2.

Then, the system control unit controls the group classification process such that, when the staff mode is selected, a process with a smaller processing load is executed as compared with when the non-staff mode is selected. Accordingly, the group classification process with a small processing load is executed in the staff mode.

As an example, in the staff mode when there are no non-staff persons, the system control unit can turn off a process with a high processing load and execute the group classification process with a low processing load. In the non-staff mode when there are non-staff persons, the system control unit can turn on a process with a high processing load and execute the group classification process with a high processing load.

As described above, the system control unit can switch the mode in which the host management device 10 executes control for monitoring or in accordance with the monitoring result based on whether the recognition target people are only staff members who are people not requiring monitoring (not requiring much consideration) or include non-staff persons who are people requiring monitoring as much as possible. In fact, when person recognition is performed regardless of whether the non-staff persons are present, a constant processing load remains to apply. On the other hand, in the control system according to the present embodiment, with the configuration described above, when load reduction measures are taken in accordance with whether non-staff persons are present, that is, the system including the mobile robot 20 that autonomously moves is controlled, the processing load is changed flexibly depending on situations (conditions), whereby the power consumption of the system can be reduced.

Control Block Diagram

Figure 2:
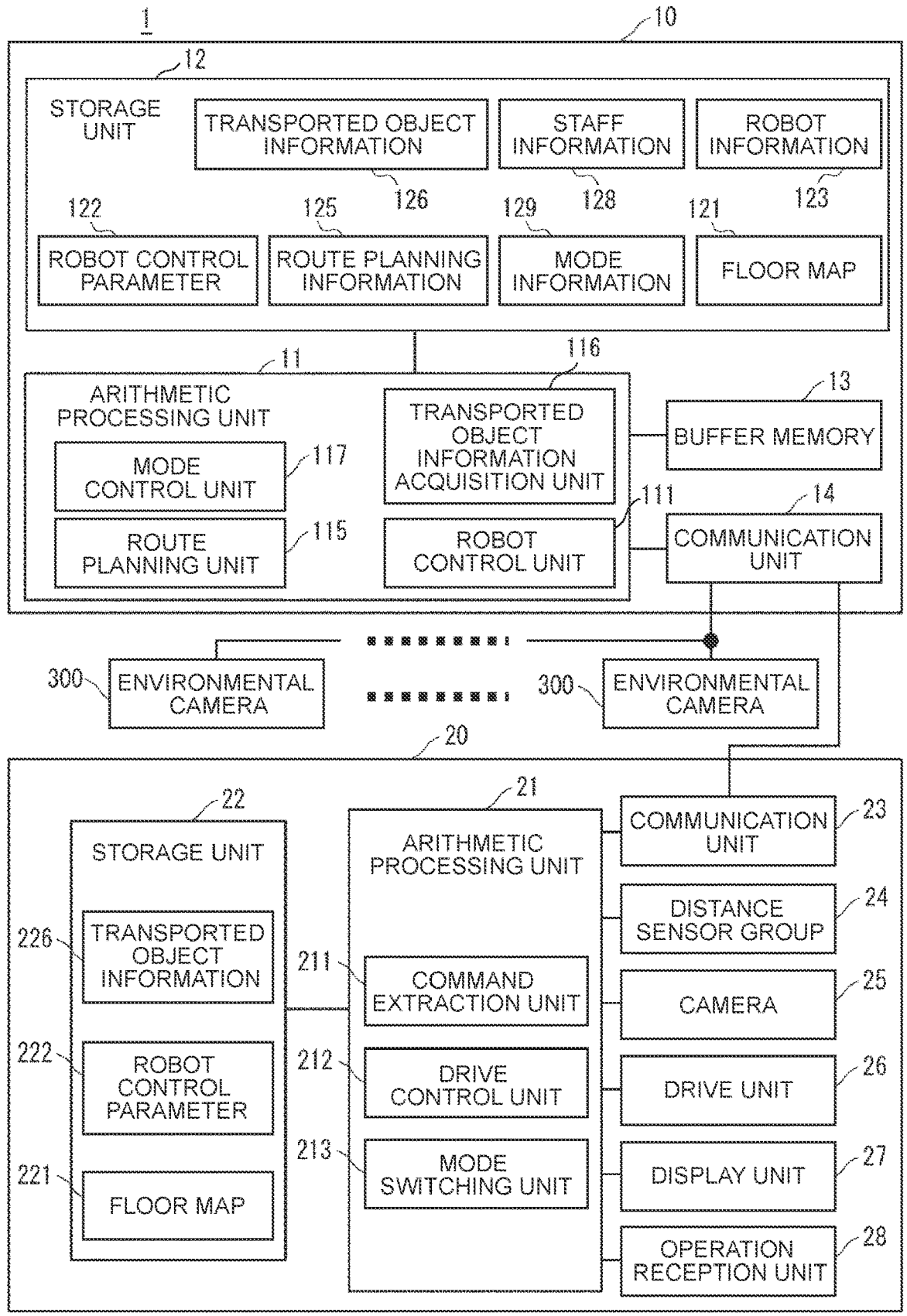
FIG. 2 is a control block diagram of the transport system shown in FIG. 1.

FIG. 2 shows a control block diagram showing a control system of the transport system 1. As shown in FIG. 2, the transport system 1 can include the host management device 10, the mobile robot 20, and the environmental cameras 300 that are environmental cameras of the above.

The transport system 1 efficiently controls the mobile robots 20 while causing the mobile robots 20 to autonomously move within a predetermined facility. Therefore, a plurality of the environmental cameras 300 is installed in the facility. For example, the environmental cameras 300 are each installed in a passage, a hallway, an elevator, an entrance, etc. in the facility. The environmental cameras 300 are each used not only for controlling the mobile robot 20, but also for monitoring people as described above. However, in the present embodiment, use of the environmental cameras 300 may not be used for controlling the mobile robot 20, and may be, for example, used only for monitoring people, or a camera for monitoring people and a camera for monitoring the mobile robot 20 may be separately provided as the environmental cameras 300.

The environmental cameras 300 each acquire an image of the range in which the person or the mobile robot 20 moves, and outputs image data representing the image. This image data may be still image data or moving image data. In the case of the still image data, the still image data is obtained at each imaging interval. Further, in the transport system 1, the host management device 10 collects the images acquired by the environmental cameras 300 and the information based on the images. For the images used for controlling the mobile robot 20, the images or the like acquired by the environmental cameras 300 may be directly transmitted to the mobile robot 20. The environmental cameras 300 can be provided as monitoring cameras or the like provided in passages or entrances in the facility. The environmental cameras 300 may be used to determine the distribution of the congestion status in the facility.

Further, as in the transport system 1 exemplified herein, the system control unit (an arithmetic processing unit 11 in the example of FIG. 2) of the host management device 10 can control the mobile robot 20 that autonomously moves in a predetermined area such as part of the facility or the entire facility. The environmental cameras 300 can be installed at positions spaced apart from a traveling surface of the mobile robot 20 so as to capture the image around the mobile robot 20 that is traveling. Accordingly, the mobile robot 20 can also be monitored by the environmental cameras 300 for monitoring people.

For transportation, in the transport system 1, the host management device 10 plans a route based on the transport request information. The host management device 10 instructs a destination for each mobile robot 20 based on the generated route planning information. Then, the mobile robot 20 autonomously moves toward the destination designated by the host management device 10. The mobile robot 20 autonomously moves toward the destination using sensors, floor maps, position information, and the like provided in the mobile robot 20 itself.

For example, the mobile robot 20 travels so as not to come into contact with surrounding equipment, people, objects, and walls (hereinafter collectively referred to as peripheral objects). Specifically, the mobile robot 20 detects the distance from the peripheral object and travels while keeping a distance from the peripheral object by a certain distance (defined as a distance threshold value) or more. When the distance from the peripheral object becomes equal to or less than the distance threshold value, the mobile robot 20 decelerates or stops. With this configuration, the mobile robot 20 can travel without coming into contact with the peripheral objects. Since contact can be avoided, safe and efficient transportation is possible.

Also, a person as a distance detection target can be classified into either the staff member or the non-staff person by the group classification process, and the distance threshold value can be varied depending on the classification result, for example, the distance threshold value of the non-staff person can be set longer than the distance threshold value of the staff member.

The host management device 10 includes the arithmetic processing unit 11, a storage unit 12, a buffer memory 13, and a communication unit 14. The arithmetic processing unit 11 performs arithmetic for monitoring the person and the mobile robot 20 and arithmetic for controlling and managing the mobile robot 20. The arithmetic processing unit 11 can be implemented as a device capable of executing a program such as a central processing unit (CPU) of a computer, for example. Various functions can also be realized by a program. Only a robot control unit 111, a route planning unit 115, a transported object information acquisition unit 116, and a mode control unit 117 that are characteristics of the arithmetic processing unit 11 are shown in FIG. 2, but other processing blocks can also be provided.

The robot control unit 111 performs arithmetic for remotely controlling the mobile robot 20 and generates a control signal. The robot control unit 111 generates a control signal based on the route planning information 125 and the like, which will be described later. Further, the robot control unit 111 generates a control signal based on various types of information obtained from the environmental cameras 300 and the mobile robots 20. The control signal may include update information such as a floor map 121, robot information 123, and a robot control parameter 122, which will be described later. That is, when various types of information are updated, the robot control unit 111 generates a control signal in accordance with the updated information. The robot control unit 111 also generates a control signal for the mobile robot 20 to execute mode switching control in accordance with the mode switching control from the mode control unit 117, which will be described later.

The transported object information acquisition unit 116 acquires information on the transported object. The transported object information acquisition unit 116 acquires information on the content (type) of the transported object that is being transported by the mobile robot 20. The transported object information acquisition unit 116 acquires transported object information relating to the transported object that is being transported by the mobile robot 20 in which an error has occurred.

The route planning unit 115 performs route planning for each mobile robot 20. When the transport task is input, the route planning unit 115 performs route planning for transporting the transported object to the transport destination (destination) based on the transport request information. Specifically, the route planning unit 115 refers to the route planning information 125, the robot information 123, and the like that are already stored in the storage unit 12, and determines the mobile robot 20 that executes the new transport task. The starting point is the current position of the mobile robot 20, the transport destination of the immediately preceding transport task, the receiving point of the transported object, or the like. The destination is the transport destination of the transported object, a standby location, a charging location, or the like.

Here, the route planning unit 115 sets passing points from the starting point to the destination of the mobile robot 20. The route planning unit 115 sets the passing order of the passing points for each mobile robot 20. The passing points are set, for example, at branch points, intersections, lobbies in front of elevators, and their surroundings. In a narrow passage, it may be difficult for the mobile robots 20 to pass each other. In such a case, the passing point may be set at a location before the narrow passage. Candidates for the passing points may be registered in the floor map 121 in advance.

The route planning unit 115 determines the mobile robot 20 that performs each transport task from among the mobile robots 20 such that the entire system can efficiently execute the task. In some embodiments, the route planning unit 115 assigns the transport task to the mobile robot 20 on standby and in some embodiments, the mobile robot 20 close to the transport source.

The route planning unit 115 sets passing points including the starting point and the destination for the mobile robot 20 to which the transport task is assigned. For example, when there are two or more movement routes from the transport source to the transport destination, the passing points are set such that the movement can be performed in a shorter time. Thus, the host management device 10 updates the information indicating the congestion status of the passages based on the images of the camera or the like. Specifically, locations where other mobile robots 20 are passing and locations with many people have a high degree of congestion. Therefore, the route planning unit 115 sets the passing points so as to avoid locations with a high degree of congestion.

The mobile robot 20 may be able to move to the destination by either a counterclockwise movement route or a clockwise movement route. In such a case, the route planning unit 115 sets the passing points so as to pass through the less congested movement route. The route planning unit 115 sets one or more passing points to the destination, whereby the mobile robot 20 can move along a movement route that is not congested. For example, when a passage is divided at a branch point or an intersection, the route planning unit 115 sets a passing point at the branch point, the intersection, the corner, and the surroundings as appropriate. Accordingly, the transport efficiency can be improved.

The route planning unit 115 may set the passing points in consideration of the congestion status of the elevator, the moving distance, and the like. Further, the host management device 10 may estimate the number of the mobile robots 20 and the number of people at the estimated time when the mobile robot 20 passes through a certain location. Then, the route planning unit 115 may set the passing points in accordance with the estimated congestion status. Further, the route planning unit 115 may dynamically change the passing points in accordance with a change in the congestion status. The route planning unit 115 sets the passing points sequentially for the mobile robot 20 to which the transport task is actually assigned. The passing points may include the transport source and the transport destination. The mobile robot 20 autonomously moves so as to sequentially pass through the passing points set by the route planning unit 115.

The mode control unit 117 includes the group classification unit and corresponds to part of the system control unit or the entire system control unit. The mode control unit 117 executes control for switching the mode between the first operation mode (exemplified as the non-staff mode) and the second operation mode (exemplified as the staff mode) in accordance with the presence status of people in the facility. Switching the mode in accordance with the presence status of people in the facility makes it possible to reduce the processing load and to reduce the power consumption in the system including the mobile robot 20. The control of the mode control unit 117 will be described later.

The storage unit 12 is a storage unit that stores information for monitoring of people and management and control of the robot including monitoring of the robot. In the example of FIG. 2, the floor map 121, the robot information 123, the robot control parameter 122, the route planning information 125, the transported object information 126, staff information 128, and mode information 129 are shown, but the information stored in the storage unit 12 may include other information. The arithmetic processing unit 11 performs arithmetic using the information stored in the storage unit 12 when performing various processes. Various types of information stored in the storage unit 12 can be updated to the latest information.

The floor map 121 is map information of a facility in which the mobile robot 20 moves. The floor map 121 may be created in advance, may be generated from information obtained from the mobile robot 20, or may be information obtained by adding map correction information that is generated from information obtained from the mobile robot 20, to a basic map created in advance.

For example, the floor map 121 stores the positions and information of walls, gates, doors, stairs, elevators, fixed shelves, etc. of the facility. The floor map 121 may be expressed as a two-dimensional grid map. In this case, in the floor map 121, information on walls and doors, for example, is attached to each grid.

The robot information 123 indicates the ID, model number, specifications, and the like of the mobile robot 20 managed by the host management device 10. The robot information 123 may include position information indicating the current position of the mobile robot 20. The robot information 123 may include information indicating whether the mobile robot 20 is executing a task or at standby. Further, the robot information 123 may also include information indicating whether the mobile robot 20 is operating, out-of-order, or the like. Still further, the robot information 123 may include information on the transported object that can be transported and the transported object that cannot be transported.

The robot control parameter 122 indicates control parameters such as a threshold distance from a peripheral object for the mobile robot 20 managed by the host management device 10. The threshold distance is a margin distance for avoiding contact with the peripheral objects including a person. Further, the robot control parameter 122 may include information on the operating intensity such as the speed upper limit value of the moving speed of the mobile robot 20.

The robot control parameter 122 may be updated depending on the situation. The robot control parameter 122 may include information indicating the availability and usage status of the storage space of a storage 291. The robot control parameter 122 may include information on a transported object that can be transported and a transported object that cannot be transported. The above-described various types of information in the robot control parameter 122 are associated with each mobile robot 20.

The route planning information 125 includes the route planning information planned by the route planning unit 115. The route planning information 125 includes, for example, information indicating a transport task. The route planning information 125 may include the ID of the mobile robot 20 to which the task is assigned, the starting point, the content of the transported object, the transport destination, the transport source, the estimated arrival time at the transport destination, the estimated arrival time at the transport source, the arrival deadline, and the like. In the route planning information 125, the various types of information described above may be associated with each transport task. The route planning information 125 may include at least part of the transport request information input from the user U1.

Further, the route planning information 125 may include information on the passing points for each mobile robot 20 and each transport task. For example, the route planning information 125 includes information indicating the passing order of the passing points for each mobile robot 20. The route planning information 125 may include the coordinates of each passing point on the floor map 121 and information on whether the mobile robot 20 has passed the passing points.

The transported object information 126 is information on the transported object for which the transport request has been made. For example, the transported object information 126 includes information such as the content (type) of the transported object, the transport source, and the transport destination. The transported object information 126 may include the ID of the mobile robot 20 in charge of the transportation. Further, the transported object information 126 may include information indicating the status such as transport under way, pre-transport (before loading), and post-transport. These types of information in the transported object information 126 are associated with each transported object.

The staff information 128 is information for classifying whether a user of the facility is a staff member. That is, the staff information 128 includes information for classifying the person included in the image data as the non-staff person or the staff member. For example, the staff information 128 includes information on the staff members registered in advance. The mode information 129 includes information for controlling each mode based on the classification result. Details of the staff information 128 and the mode information 129 will be described later.

The route planning unit 115 refers to various types of information stored in the storage unit 12 to formulate a route plan. For example, the route planning unit 115 determines the mobile robot 20 that executes the task, based on the floor map 121, the robot information 123, the robot control parameter 122, and the route planning information 125. Then, the route planning unit 115 refers to the floor map 121 and the like to set the passing points to the transport destination and the passing order thereof. Candidates for the passing points are registered in the floor map 121 in advance. The route planning unit 115 sets the passing points in accordance with the congestion status and the like. In the case of continuous processing of tasks, the route planning unit 115 may set the transport source and the transport destination as the passing points.

Two or more of the mobile robots 20 may be assigned to one transport task. For example, when the transported object is larger than the transportable capacity of the mobile robot 20, one transported object is divided into two and loaded on the two mobile robots 20. Alternatively, when the transported object is heavier than the transportable weight of the mobile robot 20, one transported object is divided into two and loaded on the two mobile robots 20. With this configuration, one transport task can be shared and executed by two or more mobile robots 20. It goes without saying that, when the mobile robots 20 of different sizes are controlled, route planning may be performed such that the mobile robot 20 capable of transporting the transported object receives the transported object.

Further, one mobile robot 20 may perform two or more transport tasks in parallel. For example, one mobile robot 20 may simultaneously load two or more transported objects and sequentially transport the transported objects to different transport destinations. Alternatively, while one mobile robot 20 is transporting one transported object, another transported object may be loaded on the mobile robot 20. The transport destinations of the transported objects loaded at different locations may be the same or different. With this configuration, the tasks can be executed efficiently.

In such a case, storage information indicating the usage status or the availability of the storage space of the mobile robot 20 may be updated. That is, the host management device 10 may manage the storage information indicating the availability and control the mobile robot 20. For example, the storage information is updated when the transported object is loaded or received. When the transport task is input, the host management device 10 refers to the storage information and directs the mobile robot 20 having room for loading the transported object to receive the transported object. With this configuration, one mobile robot 20 can execute a plurality of transport tasks at the same time, and two or more mobile robots 20 can share and execute the transport tasks. For example, a sensor may be installed in the storage space of the mobile robot 20 to detect the availability. Further, the capacity and weight of each transported object may be registered in advance.

The buffer memory 13 is a memory that stores intermediate information generated in the processing of the arithmetic processing unit 11. The communication unit 14 is a communication interface for communicating with the environmental cameras 300 provided in the facility where the transport system 1 is used, and at least one mobile robot 20. The communication unit 14 can perform both wired communication and wireless communication. For example, the communication unit 14 transmits a control signal for controlling each mobile robot 20 to each mobile robot 20. The communication unit 14 receives the information collected by the mobile robot 20 and the environmental cameras 300. The communication unit 14 also transmits information for remotely controlling operation/non-operation of the environmental camera 300 to the environmental camera 300 as the control target.

The mobile robot 20 includes an arithmetic processing unit 21, a storage unit 22, a communication unit 23, a distance sensor group 24, cameras 25, a drive unit 26, a display unit 27, and an operation reception unit 28. Although FIG. 2 shows only typical processing blocks provided in the mobile robot 20, the mobile robot 20 also includes many other processing blocks that are not shown.

The communication unit 23 is a communication interface for communicating with the communication unit 14 of the host management device 10. The communication unit 23 communicates with the communication unit 14 using, for example, a wireless signal. Each distance sensor of the distance sensor group 24 is, for example, a proximity sensor, and outputs proximity object distance information indicating a distance from an object or a person that is present around the mobile robot 20. The distance sensor group 24 includes a ranging sensor such as a LIDAR. Manipulating the emission direction of the optical signal makes it possible to measure the distance to the peripheral object. Also, the peripheral objects may be recognized from point cloud data detected by the ranging sensor or the like.

The camera 25, for example, captures an image for grasping the surrounding situation of the mobile robot 20. The camera 25 can also capture an image of a position marker provided on the ceiling or the like of the facility, for example. The mobile robot 20 may be made to grasp the position of the mobile robot 20 itself using this position marker. Further, the camera 25 can also function as one of the environmental cameras 300.

The drive unit 26 drives drive wheels provided on the mobile robot 20. Note that, the drive unit 26 may include an encoder or the like that detects the number of rotations of the drive wheels and the drive motor thereof. The position of the mobile robot 20 (current position) may be estimated based on the output of the above encoder. The mobile robot 20 detects its current position and transmits the information to the host management device 10. The mobile robot 20 estimates its own position on the floor map 121 by odometry or the like.

The display unit 27 and the operation reception unit 28 are realized by a touch panel display. The display unit 27 displays a user interface screen that serves as the operation reception unit 28. Further, the display unit 27 may display information indicating the destination of the mobile robot 20 and the state of the mobile robot 20. The operation reception unit 28 receives an operation from the user. The operation reception unit 28 includes various switches provided on the mobile robot 20 in addition to the user interface screen displayed on the display unit 27.

The arithmetic processing unit 21 performs arithmetic used for controlling the mobile robot 20. The arithmetic processing unit 21 can be implemented as a device capable of executing a program such as a CPU of a computer, for example. Various functions can also be realized by a program. The arithmetic processing unit 21 includes a command extraction unit 211, a drive control unit 212, and a mode switching unit 213. Although FIG. 2 shows only typical processing blocks included in the arithmetic processing unit 21, the arithmetic processing unit 21 includes processing blocks that are not shown. The arithmetic processing unit 21 may search for a route between the passing points.

The command extraction unit 211 extracts a movement command from the control signal given by the host management device 10. For example, the movement command includes information on the next passing point. For example, the control signal may include information on the coordinates of the passing points and the passing order of the passing points. The command extraction unit 211 extracts these types of information as a movement command.

Further, the movement command may include information indicating that the movement to the next passing point has become possible. When the passage width is narrow, the mobile robots 20 may not be able to pass each other. There are also cases where the passage cannot be used temporarily. In such a case, the control signal includes a command to stop the mobile robot 20 at a passing point before the location at which the mobile robot 20 should stop. After the other mobile robot 20 has passed or after movement in the passage has become possible, the host management device 10 outputs a control signal informing the mobile robot 20 that the mobile robot 20 can move in the passage. Thus, the mobile robot 20 that has been temporarily stopped resumes movement.

The drive control unit 212 controls the drive unit 26 such that the drive unit 26 moves the mobile robot 20 based on the movement command given from the command extraction unit 211. For example, the drive unit 26 includes drive wheels that rotate in accordance with a control command value from the drive control unit 212. The command extraction unit 211 extracts the movement command such that the mobile robot 20 moves toward the passing point received from the host management device 10. The drive unit 26 rotationally drives the drive wheels. The mobile robot 20 autonomously moves toward the next passing point. With this configuration, the mobile robot 20 sequentially passes the passing points and arrives at the transport destination. Further, the mobile robot 20 may estimate its position and transmit a signal indicating that the mobile robot 20 has passed the passing point to the host management device 10. Thus, the host management device 10 can manage the current position and the transportation status of each mobile robot 20.

Also, the command extraction unit 211 extracts a mode switching command from the control signal given from the host management device 10 and transfers the mode switching command to the mode switching unit 213. For example, the mode switching command can contain information indicating whether the mode to switch to is the staff mode or the non-staff mode. Then, the command extraction unit 211 extracts this type of information as the mode switching command. Alternatively, the control signal may always contain information indicating the mode.

In the present embodiment, an example is given in which the configuration including the mobile robot 20 as a target for mode switching is employed. However, a configuration in which the mobile robot 20 is not included can also be employed. In that case, the control signal given to the mobile robot 20 from the host management device 10 does not include the mode switching command.

The mode switching unit 213 executes control to switch the operation mode of the mobile robot 20 to the mode indicated by the command based on the mode switching command given from the command extraction unit 211. The mode switching unit 213 only needs to transfer a command to a predetermined component as a target of the switching control to switch to a process corresponding to the mode.

For example, the target of the switching control may be any one or more of the arithmetic processing unit 21, the storage unit 22, the communication unit 23, the distance sensor group 24, the camera 25, the drive unit 26, the display unit 27, and the operation reception unit 28. When the target of the switching control is the arithmetic processing unit 21 itself, the arithmetic processing unit 21 can be configured to include a first arithmetic processing unit that executes arithmetic processing and a second arithmetic processing unit that executes arithmetic processing with lower power consumption than that of the first arithmetic processing unit 21, or configured to be able to execute a process with the low power consumption in the staff mode while the processing performance is lowered.

Similarly, other components can be configured to be switchable between high power consumption processing in the non-staff mode and low power consumption processing in the staff mode. For example, the storage unit 22, the communication unit 23, the distance sensor group 24, the camera 25, the drive unit 26, the display unit 27, and the operation reception unit 28 can reduce power consumption by reducing the processing frequency. Further, for the camera 25, the power consumption can be reduced by lowering the resolution of the image of one frame, in addition to lowering the processing frequency represented by the imaging rate. The power consumption can be reduced by lowering the display luminance and the sensitivity of operation detection for the display unit 27 and the operation reception unit 28, respectively, in addition to lowering the processing frequency represented by the refresh rate and detection frequency for the display unit 27 and the operation reception unit 28, respectively.

The storage unit 22 stores a floor map 221, a robot control parameter 222, and transported object information 226. FIG. 2 shows part of the information stored in the storage unit 22, including information other than the floor map 221, the robot control parameter 222, and the transported object information 226 shown in FIG. 2. The floor map 221 is map information of a facility in which the mobile robot 20 moves. This floor map 221 is, for example, a download of the floor map 121 of the host management device 10. The floor map 221 may be created in advance. Further, the floor map 221 may not be the map information of the entire facility but may be the map information including part of the area in which the mobile robot 20 is scheduled to move.

The robot control parameter 222 is a parameter for operating the mobile robot 20. The robot control parameter 222 includes, for example, the distance threshold value from a peripheral object. Further, the robot control parameter 222 also includes a speed upper limit value of the mobile robot 20.

Similar to the transported object information 126, the transported object information 226 includes information on the transported object. The transported object information 226 includes information such as the content (type) of the transported object, the transport source, and the transport destination. The transported object information 226 may include information indicating the status such as transport under way, pre-transport (before loading), and post-transport. These types of information in the transported object information 226 are associated with each transported object. The transported object information 226 only needs to include information on the transported object transported by the mobile robot 20. Therefore, the transported object information 226 is part of the transported object information 126. That is, the transported object information 226 does not have to include the information on the transportation performed by other mobile robots 20.

The drive control unit 212 refers to the robot control parameter 222 and stops the operation or decelerates in response to the fact that the distance indicated by the distance information obtained from the distance sensor group 24 has fallen below the distance threshold value. The drive control unit 212 controls the drive unit 26 such that the mobile robot 20 travels at a speed equal to or lower than the speed upper limit value. The drive control unit 212 limits the rotation speed of the drive wheels such that the mobile robot 20 does not move at a speed equal to or higher than the speed upper limit value.

Configuration of Mobile Robot 20

Figure 3:
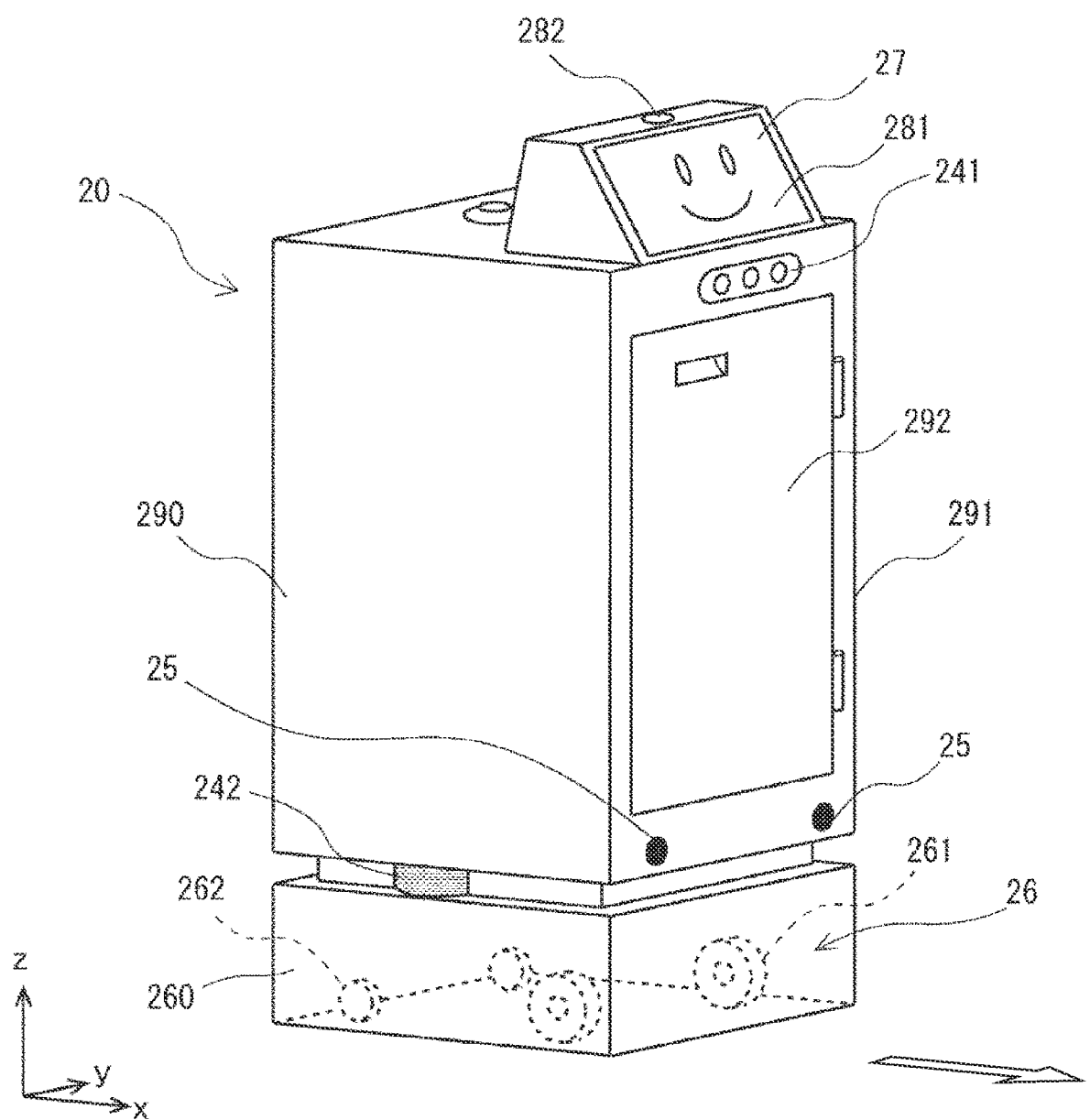
FIG. 3 is a schematic view showing an example of the mobile robot.

Here, the appearance of the mobile robot 20 will be described. FIG. 3 shows a schematic view of the mobile robot 20. The mobile robot 20 shown in FIG. 3 is one of the modes of the mobile robot 20, and may be in another form. In FIG. 3, the x direction is the forward and backward directions of the mobile robot 20, the y direction is the right-left direction of the mobile robot 20, and the z direction is the height direction of the mobile robot 20.

The mobile robot 20 includes a main body portion 290 and a carriage portion 260. The main body portion 290 is installed on the carriage portion 260. The main body portion 290 and the carriage portion 260 each have a rectangular parallelepiped housing, and each component is installed inside the housing. For example, the drive unit 26 is housed inside the carriage portion 260.

The main body portion 290 is provided with the storage 291 that serves as a storage space and a door 292 that seals the storage 291. The storage 291 is provided with a plurality of shelves, and the availability is managed for each shelf. For example, by providing various sensors such as a weight sensor in each shelf, the availability can be updated. The mobile robot 20 moves autonomously to transport the transported object stored in the storage 291 to the destination instructed by the host management device 10. The main body portion 290 may include a control box or the like (not shown) in the housing. Further, the door 292 may be able to be locked with an electronic key or the like. Upon arriving at the transport destination, the user U2 unlocks the door 292 with the electronic key. Alternatively, the door 292 may be automatically unlocked when the mobile robot 20 arrives at the transport destination.

As shown in FIG. 3, front-rear distance sensors 241 and right-left distance sensors 242 are provided as the distance sensor group 24 on the exterior of the mobile robot 20. The mobile robot 20 measures the distance of the peripheral objects in the front-rear direction of the mobile robot 20 by the front-rear distance sensors 241. The mobile robot 20 measures the distance of the peripheral objects in the right-left direction of the mobile robot 20 by the right-left distance sensors 242.

For example, the front-rear distance sensor 241 is provided on the front surface and the rear surface of the housing of the main body portion 290. The right-left distance sensor 242 is provided on the left side surface and the right side surface of the housing of the main body portion 290. The front-rear distance sensors 241 and the right-left distance sensors 242 are, for example, ultrasonic distance sensors and laser rangefinders. The front-rear distance sensors 241 and the right-left distance sensors 242 detect the distance from the peripheral objects. When the distance from the peripheral object detected by the front-rear distance sensor 241 or the right-left distance sensor 242 becomes equal to or less than the distance threshold value, the mobile robot 20 decelerates or stops.

The drive unit 26 is provided with drive wheels 261 and casters 262. The drive wheels 261 are wheels for moving the mobile robot 20 frontward, rearward, rightward, and leftward. The casters 262 are driven wheels that roll following the drive wheels 261 without being given a driving force. The drive unit 26 includes a drive motor (not shown) and drives the drive wheels 261.

For example, the drive unit 26 supports, in the housing, two drive wheels 261 and two casters 262, each of which are in contact with the traveling surface. The two drive wheels 261 are arranged such that their rotation axes coincide with each other. Each drive wheel 261 is independently rotationally driven by a motor (not shown). The drive wheels 261 rotate in accordance with a control command value from the drive control unit 212 in FIG. 2. The casters 262 are driven wheels that are provided such that a pivot axis extending in the vertical direction from the drive unit 26 pivotally supports the wheels at a position away from the rotation axis of the wheels, and thus follow the movement direction of the drive unit 26.

For example, when the two drive wheels 261 are rotated in the same direction at the same rotation speed, the mobile robot 20 travels straight, and when the two drive wheels 261 are rotated at the same rotation speed in the opposite directions, the mobile robot 20 pivots around the vertical axis extending through approximately the center of the two drive wheels 261. Further, by rotating the two drive wheels 261 in the same direction and at different rotation speeds, the mobile robot 20 can proceed while turning right and left. For example, by making the rotation speed of the left drive wheel 261 higher than the rotation speed of the right drive wheel 261, the mobile robot 20 can make a right turn. In contrast, by making the rotation speed of the right drive wheel 261 higher than the rotation speed of the left drive wheel 261, the mobile robot 20 can make a left turn. That is, the mobile robot 20 can travel straight, pivot, turn right and left, etc. in any direction by controlling the rotation direction and the rotation speed of each of the two drive wheels 261.

Further, in the mobile robot 20, the display unit 27 and an operation interface 281 are provided on the upper surface of the main body portion 290. The operation interface 281 is displayed on the display unit 27. When the user touches and operates the operation interface 281 displayed on the display unit 27, the operation reception unit 28 can receive an instruction input from the user. An emergency stop button 282 is provided on the upper surface of the display unit 27. The emergency stop button 282 and the operation interface 281 function as the operation reception unit 28.

The display unit 27 is, for example, a liquid crystal panel or an organic electroluminescence display, and displays a character's face as an illustration or presents information on the mobile robot 20 in text or with an icon. By displaying a character's face on the display unit 27, it is possible to give surrounding observers the impression that the display unit 27 is a pseudo face portion. It is also possible to use the display unit 27 or the like installed in the mobile robot 20 as the user terminal 400.

The cameras 25 are installed on the front surface of the main body portion 290. Here, the two cameras 25 function as stereo cameras. That is, the two cameras 25 having the same angle of view are provided so as to be horizontally separated from each other. An image captured by each camera 25 is output as image data. This image data may be still image data or moving image data. In the case of the still image data, the still image data is obtained at each imaging interval. It is possible to calculate the distance from the subject and the size of the subject based on the image data of the two cameras 25. The arithmetic processing unit 21 can detect a person, an obstacle, or the like at positions forward in the movement direction by analyzing the images of the cameras 25. When there are people or obstacles at positions forward in the traveling direction, the mobile robot 20 moves along the route while avoiding the people or the obstacles. Further, the image data of the cameras 25 is transmitted to the host management device 10.

The mobile robot 20 recognizes the peripheral objects and identifies the position of the mobile robot 20 itself by analyzing the image data output by the cameras 25 and the detection signals output by the front-rear distance sensors 241 and the right-left distance sensors 242. The cameras 25 capture images of the front of the mobile robot 20 in the traveling direction. As shown in FIG. 3, the mobile robot 20 has the side on which the cameras 25 are installed as the front of the mobile robot 20. That is, during normal movement, the traveling direction is the forward direction of the mobile robot 20 as shown by the arrow.

Mode Control Process

Figure 4:
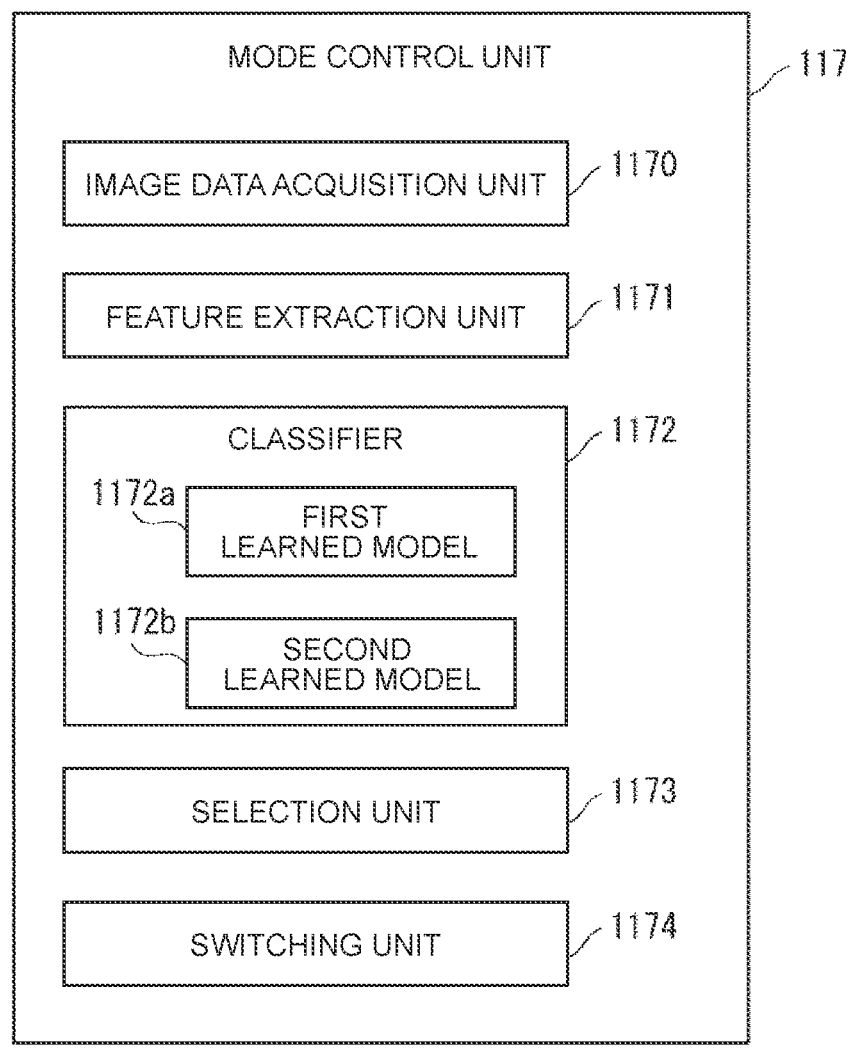
FIG. 4 is a control block diagram showing a control system for mode control.

Next, a mode control process will be described with reference to FIG. 4. Here, a description will be made on assumption that the host management device 10 mainly executes the process for mode control. Therefore, FIG. 4 is a block diagram mainly showing the control system of the mode control unit 117. However, the mobile robot 20 may be provided with a mode control unit, and the mode control unit may be configured to execute at least part of the process of the mode control unit 117 as a main body. Alternatively, other equipment such as the environmental cameras 300 can be configured to execute at least part of the process for the mode control.

The mode control unit 117 includes an image data acquisition unit 1170, a feature extraction unit 1171, a classifier 1172, a selection unit 1173, and a switching unit 1174.

The image data acquisition unit 1170 acquires image data of images captured by the environmental camera 300. Here, the image data may be the image data itself captured by the environmental camera 300, or may be data obtained by processing the image data. For example, the image data may be feature amount data extracted from the image data.

Further, the image data may be added with information such as the imaging time and the imaging location. The following description will be made on assumption that the image data acquisition unit 1170 acquires image data from the environmental cameras 300. However, as described above, the image data is not limited to the image data from the environmental camera 300, and the image data from the camera 25 of the mobile robot 20 may be acquired. That is, the image data acquisition unit 1170 may acquire the image data based on images captured by the camera 25 provided on the mobile robot 20. The image data acquisition unit 1170 may acquire the image data from multiple environmental cameras 300.

The feature extraction unit 1171 corresponds to part of the group classification unit described above, and extracts the features of the person in the captured image. More specifically, the feature extraction unit 1171 detects a person included in the image data by executing image processing on the image data. Then, the feature extraction unit 1171 extracts the features of the person included in the image data. Also, an arithmetic processing unit (not shown) provided in the environmental camera 300 may execute at least part of the process for extracting the feature amount. Note that, as the means for detecting that a person is included in the image data, various techniques such as a Histograms of Oriented Gradients (HOG) feature amount and machine learning including convolution processing are known to those skilled in the art. Therefore, detailed description will be omitted here.

The feature extraction unit 1171 detects the clothing color of the detected person. More specifically, for example, the feature extraction unit 1171 calculates the ratio of the area occupied by the specific color from the clothing of the detected person. Alternatively, the feature extraction unit 1171 detects the clothing color in a specific portion from the clothes of the detected person. As described above, the feature extraction unit 1171 extracts the characteristic parts of the clothes of the staff member.

Further, the characteristic shape of the clothes of the staff member or the personal belongings of the staff member, such as characteristic attachments, may be extracted as features. Furthermore, the feature of the facial image of the feature extraction unit 1171 may be extracted. That is, the feature extraction unit 1171 may extract features for face recognition. The feature extraction unit 1171 supplies the extracted feature information to the classifier 1172.

The classifier 1172 corresponds to part of the group classification unit described above, and classifies a person into a non-staff person or a staff member that is set in advance based on the feature extraction result. For example, the classifier 1172 classifies the person based on the feature information received from the feature extraction unit 1171 and the staff information 128 stored in the storage unit 12. The classifier 1172 supplies the classification result to the selection unit 1173. The classifier 1172 supplies the classification result to the selection unit 1173.

Further, the classifier 1172 can include a first learned model 1172a that is a learned model and a second learned model 1172b that is a learned model that provides a processing result with a lower load than that of the first learned model 1172a. In that case, the classifier 1172 may perform classification using any one of two learned models. The first learned model 1172a is used in the non-staff mode, and the second learned model 1172b is used in the staff mode. This switching is performed by the switching unit 1174 to be described later.

Both the first learned model 1172a and the second learned model 1172b can be configured as a machine-learned model that can use data including feature information and information (e.g., the staff information 128) indicating whether the person is either the non-staff person or the staff member indicated by the staff information of the person having the feature information as training data, regardless of its algorithm or the like.

However, as described above, it is assumed that the second learned model 1172b is constructed as a model with a smaller processing load than that of the first learned model 1172a, that is, constructed to be a lightweight model. For example, compared to the first learned model 1172a, the second learned model 1172b can be constructed to have a smaller processing load by reducing at least one of the number of pieces of feature information or the number of pixels of an image as input parameters, and the number of intermediate layers. Note that, reduction of the number of intermediate layers results in reducing the number of network layers. However, it is also possible to make the processing load of the second learned model 1172b smaller than the processing load of the first learned model 1172a by making hyperparameters other than the above different.

Here, the feature extraction unit 1171 and the classifier 1172 are described separately. However, the function of the feature extraction unit 1171 can be included in the classifier 1172. In that case, the function of the feature extraction unit 1171 can be a function of extracting features using a learned model.

On the basis of the classification result received from the classifier 1172, the selection unit 1173 selects the non-staff mode when there is a person belonging to the non-staff person, and selects the staff mode when there is no person belonging to the non-staff person. The selection unit 1173 supplies the selection result to the switching unit 1174.

The switching unit 1174 switches modes between the staff mode and the non-staff mode based on the selection result received from the selection unit 1173. For example, the switching unit 1174 can switch the mode to the staff mode when it is recognized that a person belonging to the non-staff person is not present while the non-staff mode is selected and then the staff mode is selected. On the contrary, the switching unit 1174 can switch the mode to the non-staff mode when it is recognized that a person belonging to the non-staff person is present while the staff mode is selected and then the non-staff mode is selected.

Then, as described above, when the staff mode is selected, the mode control unit 117 controls the group classification process such that a process with a smaller processing load is executed as compared with when the non-staff mode is selected. Accordingly, the group classification process with a small processing load is executed in the staff mode. In this manner, the mode control unit 117 dynamically changes the group classification process in accordance with the selected mode, thereby executing control to dynamically change the processing load.

A control target of the switching unit 1174 (hereinafter also referred to as a switching target) may include at least one component related to the group classification process, and for example, can include one or more of the classifier 1172, the feature extraction unit 1171, the image data acquisition unit 1170, the environmental cameras 300, and the mobile robot 20.

As a switching target of the classifier 1172, a learned model is exemplified. In that case, as shown in FIG. 4, the classifier 1172 is provided with the first learned model 1172a and the second learned model 1172b. Then, when the non-staff mode is selected, the switching unit 1174 controls the classifier 1172 so as to use the first learned model 1172*a* that provides a precise result. When the staff mode is selected, the switching unit 1174 controls the classifier 1172 so as to use the second learned model 1172*b* that provides the processing result with a lower load than that of the first learned model 1172*a* (and that is lightweight). Thus, the switching unit 1174 can control the classifier 1172 so as to switch the learned model to be used between the first learned model 1172*a* and the second learned model 1172*b* in accordance with the selected mode.

As described above, the mode control unit 117 can control the group classification process such that the first learned model 1172*a* is used when the non-staff mode is selected, and the second learned model 1172*b* is used when the staff mode is selected. With such control, in the present embodiment, it is possible to flexibly change the processing load related to the group classification depending on situations and reduce the power consumption.

Further, the switching targets of the classifier 1172 include processing devices that can be included in the classifier 1172, such as processors, as described later. As will be described later, the control target of the switching unit 1174 for the components other than the classifier 1172 is a processing device as each component itself or a processing device included in each component.

When the switching target is such a processing device, the following control can be executed. That is, when the staff mode is selected, the mode control unit 117 can control the group classification process so as to lower at least one of a processing accuracy and a usage ratio of the processing device to be used in the group classification process as compared with when the non-staff mode is selected. Here, the processing accuracy includes a processing information amount (output information amount) such as the frame rate and the resolution at the time of imaging. The usage rate includes values that affect the processing speed, such as the upper limit of the usage rate of the processor and the number of cores used in the processor. As described above, even when the switching target is a processing device, it is possible to flexibly change the processing load related to the group classification depending on situations, whereby the power consumption can be reduced.

Next, an example of switching will be described for each processing device as the switching target.

When the classifier 1172 is included in the control target of the switching unit 1174, the classifier 1172 can be provided with one learned model and one processor. Then, when the non-staff mode is selected, the switching unit 1174 controls the classifier 1172 so as to increase the usage ratio of the processor to be higher than that in the staff mode. On the other hand, when the staff mode is selected, the switching unit 1174 controls the classifier 1172 so as to reduce the usage ratio of the processor to be lower than that in the non-staff mode. As described above, the switching unit 1174 can also control the classifier 1172 so as to switch the usage ratio of the processor provided in the classifier 1172 in accordance with the selected mode.

Further, when the classifier 1172 is included in the control target of the switching unit 1174, the classifier 1172 can be configured of two classifiers, such as a configuration in which the classifier 1172 includes two learned models and two processors for performing the learned models, respectively. Then, when the non-staff mode is selected, the switching unit 1174 controls the classifier 1172 so as to use the classifier with a higher processing load, and when the staff mode is selected, the switching unit 1174 controls the classifier 1172 so as to use the classifier with a lower processing load. As described above, the switching unit 1174 can also control the classifier 1172 so as to switch the classifier to be used between two classifiers with different processing loads in accordance with the selected mode.

In addition, when the classifier 1172 is included in the control target of the switching unit 1174, the classifier 1172 can be provided with two processors with different processing loads and one learned model. Then, when the non-staff mode is selected, the switching unit 1174 controls the classifier 1172 so as to use the processor with a higher processing load, and when the staff mode is selected, the switching unit 1174 controls the classifier 1172 so as to use the processor with a lower processing load. As described above, the switching unit 1174 can also control the classifier 1172 so as to switch the classifier to be used between two classifiers with different processing loads in accordance with the selected mode.

When the feature extraction unit 1171 is included in the control target of the switching unit 1174, the feature extraction unit 1171 can be configured such that at least one of the number of features to be extracted (for example, the number of pieces of feature information) and the frame rate of the extraction source is changeable. Note that the frame rate of the extraction source can refer to the frequency of frames used for feature extraction in the image data acquired by the image data acquisition unit 1170. Then, when the non-staff mode is selected, the switching unit 1174 controls the feature extraction unit 1171 so as to increase at least one of the number of features to be extracted and the frame rate of the extraction source. When the staff mode is selected, the switching unit 1174 controls the feature extraction unit 1171 so as to reduce at least one of the above. As described above, the switching unit 1174 can control the feature extraction unit 1171 so as to switch the magnitude of at least one of the above in accordance with the selected mode. Further, in a configuration in which the feature extraction unit 1171 includes a learned model, in the same manner as the example described for the classifier 1172, control such as control in which two learned models with different processing loads are used and the learned model to be used is switched in accordance with the selected mode can be used.

When the image data acquisition unit 1170 is included in the control target of the switching unit 1174, the image data acquisition unit 1170 can be configured such that at least one of the acquisition rate and the number of acquisition source cameras (the environmental camera 300 and the camera 25) can be changed. Note that changing the number of acquisition source cameras means changing the number of cameras used as the information sources. Then, when the non-staff mode is selected, the switching unit 1174 controls the image data acquisition unit 1170 so as to increase at least one of the acquisition rate and the number of acquisition source cameras. When the staff mode is selected, the switching unit 1174 controls the image data acquisition unit 1170 so as to reduce at least one of the above as compared with the non-staff mode. As described above, the switching unit 1174 can control the image data acquisition unit 1170 so as to switch the magnitude of at least one of the above in accordance with the selected mode.

Here, the image data acquisition unit 1170 can be configured such that it is possible to change which type of camera, the environmental camera 300 or the camera 25, is to be the acquisition source, that is, it is possible to change the type of camera as the acquisition source, along with the number of cameras as the acquisition sources, or instead of the number of cameras as the acquisition source.

Next, a case where a camera that captures images of the surroundings of the mobile robot 20 and generates the moving image data, such as the environmental camera 300 or the camera 25, and captures image data that is the target of recognizing features of a person in the group classification process is included as the control target of the switching unit 1174 will be described. Here, the environmental camera 300 is a camera provided at a position spaced apart from the traveling surface of the mobile robot 20 so as to capture an image of the surroundings of the mobile robot 20 that is traveling, as described above. The camera 25 is a camera provided on the mobile robot 20.

When the environmental camera 300 is included in the control target of the switching unit 1174, the environmental camera 300 is configured such that at least one of the frame rate (imaging rate) and the imaging resolution can be changed. Then, when the non-staff mode is selected, the switching unit 1174 controls the environmental camera 300 such that at least one of the imaging rate and the imaging resolution is made higher than in the staff mode. On the other hand, when the staff mode is selected, the switching unit 1174 controls the environmental camera 300 such that at least one of the above is lower than in the non-staff mode. As described above, the switching unit 1174 can control the environmental camera 300 that captures image data used for the group classification process so as to switch at least one of the imaging rate and the imaging resolution of the environmental camera 300 in accordance with the selected mode. Accordingly, the processing load of the environmental camera 300 related to the group classification can be flexibly changed depending on situations, the power consumption can be reduced, and the mobile robot 20 can be monitored.

Here, an example of a control method of the environmental camera 300 by the switching unit 1174 will be described. First, the switching unit 1174 transmits a control signal including a mode switching command for mode switching to the environmental camera 300 via the communication unit 14. The environmental camera 300 receives the control signal and switches the operation mode of the environmental camera 300 to any of the non-staff mode and the staff mode indicated by the control signal. In this case, the control signal including the mode switching command may be only for some of the environmental cameras 300 in operation. Further, regardless of the control method of the environmental camera 300, an existing remote control technology may be applied.

The non-staff mode in the environmental camera 300 can be, for example, a mode (normal mode) in which the environmental camera 300 operates without power saving. On the other hand, the staff mode in the environmental camera can be a mode (power saving mode) in which at least one of the frame rate and the imaging resolution of the environmental camera 300 is made smaller (lower) than in the normal mode so as to operate the environmental camera 300 with power saving. In other words, the normal mode can be a mode in which at least one of the frame rate and the imaging resolution of the environmental camera 300 is made larger (higher) than in the power saving mode.

When the camera 25 is included in the control target of the switching unit 1174, the camera 25 is configured such that at least one of the frame rate (imaging rate) and the imaging resolution can be changed. Then, when the non-staff mode is selected, the switching unit 1174 controls the camera 25 via the mode switching unit 213 such that at least one of the imaging rate and the imaging resolution is made higher than in the staff mode. On the other hand, when the staff mode is selected, the switching unit 1174 controls the camera 25 via the mode switching unit 213 such that at least one of the above is made lower than in the non-staff mode. As described above, the switching unit 1174 can control the camera 25 that captures image data used for the group classification process so as to switch at least one of the imaging rate and the imaging resolution of the camera 25 in accordance with the selected mode. Accordingly, the processing load of the camera 25 related to the group classification can be flexibly changed depending on situations, and the power consumption can be reduced.

Here, an example of a control method of the camera 25 by the switching unit 1174 will be described. First, the switching unit 1174 instructs the robot control unit 111 to transmit a control signal including the mode switching command for mode switching to the mobile robot 20 via the communication unit 14. Accordingly, the control signal including the mode switching command is transmitted to the mobile robot 20 and received by the mobile robot 20. In this case, the control signal including the mode switching command may be for only some of the mobile robots 20 in operation. When the mode information 129 includes the current mode of each mobile robot 20, it is possible to transmit the control signal including the mode switching command only when necessary. Note that, regardless of the control method of the camera 25, an existing remote control technology may be applied.

In the mobile robot 20, the communication unit 23 receives this control signal, and the command extraction unit 211 extracts the mode switching command from the control signal and transfers the mode switching command to the mode switching unit 213. The mode switching unit 213 controls the camera 25 so as to switch the operation mode of the camera 25 between the non-staff mode and the staff mode based on the mode switching command given from the command extraction unit 211. The camera 25 switches modes in accordance with its control.

The non-staff mode in the camera 25 can be, for example, a mode (normal mode) in which the camera 25 operates without power saving. On the other hand, the staff mode in the camera 25 can be a mode (power saving mode) in which at least one of the frame rate and the imaging resolution of the camera 25 is made smaller (lower) than in the normal mode so as to operate the camera 25 with power saving. In other words, the normal mode can be a mode in which at least one of the frame rate and imaging resolution of the camera 25 is made larger (higher) than in the power saving mode.

Further, when the cameras exemplified as the environmental camera 300 and the camera 25 are included as the control target of the switching unit 1174, the switching unit 1174 can also control to change the number of cameras to be used in accordance with the selected mode. That is, when the non-staff mode is selected, the switching unit 1174 can control each camera so as to increase the number of cameras to be used. When the staff mode is selected, the switching unit 1174 can also control each camera so as to reduce the number of cameras to be used from that in the non-staff mode. As one example, when the non-staff mode is selected, the switching unit 1174 can control each camera so as to use all the cameras around the mobile robot 20, including the cameras 25 of the mobile robot 20. When the staff mode is selected, the switching unit 1174 can also control each camera so as to use only the environmental cameras 300 around the mobile robot 20.

The switching unit 1174 can change the number of cameras to be used, for example, by switching ON/OFF of the power supply or a sleep state of each camera. In the non-staff mode, all the cameras around the mobile robot 20 operate without being turned off or put into a sleep state. In the staff mode, some of cameras among the cameras around the mobile robot 20 are turned off or put into a sleep state. In other words, the switching unit 1174 outputs a control signal for switching ON/OFF of the power supply or sleep of the camera in accordance with the mode. In the staff mode, some cameras are turned off or put to sleep, whereby the processing load is reduced and the power consumption can thus be reduced. Note that, regardless of the control method of the power supply of the camera, an existing remote control technology may be applied.

Note that the number of cameras to be used is changed by changing the definition of the surroundings of the mobile robot 20 in accordance with the selected mode, that is, by setting an area represented by the surroundings in the staff mode to be narrower than an area represented by the surroundings in the non-staff mode. Here, as described above, the area represented by the surroundings can be changed by changing the predetermined distance in the case of the definition based on the distance, and by changing the number of blocks in the case of the definition based on the blocks dividing the facility.

Also, the case where the camera 25 is included in the control target of the switching unit 1174 has been described. However, a component of the mobile robot 20 other than the camera 25 can also be included as the control target of the switching unit 1174. Hereinafter, an example of such a case will be described.

In a case where a component other than the camera 25 of the mobile robot 20 is included in the control target of the switching unit 1174, and in a control example in which the camera 25 is included in the control target of the switching unit 1174, basically, an example in which the control target of the mode switching unit 213 is set to a predetermined component of the mobile robot 20 instead of the cameras 25 can be applied. Here, the predetermined component (hereinafter referred to as a target component) can include a component unrelated to the group classification process. Further, the cameras 25 can also be included in the target component.

When the mobile robot 20 is included in the control target of the switching unit 1174, the operation mode of the mobile robot 20 is configured to be switchable between the non-staff mode and the staff mode, as described as the function of the mode switching unit 213. Then, when the non-staff mode is selected, the switching unit 1174 controls the target component via the mode switching unit 213 such that the processing load becomes higher than that in the staff mode. On the other hand, when the staff mode is selected, the switching unit 1174 controls the target component via the mode switching unit 213 such that the processing load becomes lower than that in the non-staff mode. As described above, the switching unit 1174 can executes control so as to switch the processing of the target component of the mobile robot 20 in accordance with the selected mode. Accordingly, the processing load in the target component of the mobile robot 20 can be flexibly changed depending on situations, and the power consumption can be reduced.

Here, an example of a control method of the mobile robot 20 by the switching unit 1174 will be described. The switching unit 1174 can control the mobile robot 20 in the following manner, for example, in the same manner as when the cameras 25 are the control targets. First, the switching unit 1174 instructs the robot control unit 111 to transmit the control signal including the mode switching command for mode switching to the mobile robot 20 via the communication unit 14. Accordingly, the control signal including the mode switching command is transmitted to the mobile robot 20 and received by the mobile robot 20. In this case, the control signal including the mode switching command may be for only some of the mobile robots 20 in operation. When the mode information 129 includes the current mode of each mobile robot 20, it is possible to transmit the control signal including the mode switching command only when necessary. Note that, regardless of the control method of the mobile robot 20, an existing remote control technology may be applied.

In the mobile robot 20, the communication unit 23 receives this control signal, and the command extraction unit 211 extracts the mode switching command from the control signal and transfers the mode switching command to the mode switching unit 213. The mode switching unit 213 controls the target component so as to switch the operation mode of the mobile robot 20 between the non-staff mode and the staff mode based on the mode switching command given from the command extraction unit 211. The target component switches modes in accordance with its control.

The non-staff mode in the target component can be, for example, a mode (normal mode) in which the target component operates without power saving. On the other hand, the staff mode in the target component can be a mode (power saving mode) in which the target component operates with power saving.

As described above, the mode switching unit 213 can issue a command to switch to a process corresponding to the mode to any one or more of the arithmetic processing unit 21, the storage unit 22, the communication unit 23, the distance sensor group 24, the cameras 25, the drive unit 26, the display unit 27, and the operation reception unit 28, for example, as the target of the switching control, that is, as the target component. Among the above, the case where the cameras 25 are the switching targets is as described above. Further, for the other components, as shown in the example of reducing the power consumption for each component, it is possible to achieve lower power consumption in the power saving mode than in the normal mode, in accordance with the command.

Here, the control of the drive unit 26 will be described. The mode control unit 117 can change movement control of the mobile robot 20 depending on whether the non-staff mode or the staff mode is selected. The movement control can include control of the drive unit 26 via the drive control unit 212.

The mode control unit 117 can control the mobile robot 20 such that the moving speed of the mobile robot 20 in the non-staff mode is slower than the moving speed in the staff mode by switching control in the switching unit 1174. This allows slow traveling in the non-staff mode, which requires more attention to safety. For example, the mode control unit 117 can control the mobile robot 20 such that an upper limit value of the moving speed of the mobile robot 20 in the staff mode is larger than an upper limit value of the moving speed in the non-staff mode by the switching control by the switching unit 1174.

As in this example, with respect to control unrelated to the group classification process, it is also possible to execute control such that the processing load in the staff mode is larger than the processing load in the non-staff mode. However, in the present embodiment, power saving is achieved in the portion related to the group classification process. Therefore, it can be said that an increase in the power consumption in the portion unrelated to the group classification process can be suppressed. Note that, the movement control itself can be executed via the mode switching unit 213 as described above. The mode switching unit 213 only needs to change the mode of the drive control unit 212 in accordance with the mode switching command, and the drive control unit 212 only needs to execute drive control on the drive unit 26 in accordance with the mode.

Note that, on the contrary, the mode control unit 117 can also control the mobile robot 20 such that the moving speed of the mobile robot 20 in the non-staff mode is faster than the moving speed in the staff mode by the switching control by the switching unit 1174. For example, the mode control unit 117 can control the mobile robot 20 such that the upper limit value of the moving speed of the mobile robot 20 in the staff mode is smaller than the upper limit value of the moving speed in the non-staff mode by the switching control by the switching unit 1174.

Further, although the movement control of the mobile robot 20 has been described here on the premise that the movement control refers to the drive control of the drive unit 26 by the drive control unit 212. However, the control of other components such as the control to change the sensitivity of the distance sensor group 24 can also be included. Note that a collision avoidance operation of the mobile robot 20 can be changed by changing the sensitivity, and therefore the control to change the sensitivity can be regarded as part of the movement control.

Further, instead of or in addition to the control of the moving speed, the mode control unit 117 can control the mobile robot 20 such that the movement range of the mobile robot 20 in the staff mode is narrower than the movement range in the non-staff mode by the switching control by the switching unit 1174. This allows the power consumption to be reduced in the staff mode, which requires less monitoring than in the non-staff mode. Note that, the control of the movement range itself can be executed via the mode switching unit 213 as described above. For example, the mode switching unit 213 can change the mode of the drive control unit 212 in accordance with the mode switching command, and the drive control unit 212 can execute the drive control on the drive unit 26 within the movement range in accordance with the mode.

The control is not limited to the examples above, and there are various examples of control over the mobile robot 20. For example, various control examples as that described in JP 2021-86199 A can be applied. In any of the examples, when the system including the mobile robot 20 is controlled, the movement control of the mobile robot 20 can be flexibly changed depending on situations.

Staff Information

Next, an example of the staff information 128 is shown in FIG. 5. FIG. 5 is a table showing an example of the staff information 128. The staff information 128 is information for classifying the staff member and the non-staff person into corresponding groups for each type. The left column shows "categories" of the staff members. Items in the staff category are shown from top to bottom: "non-staff person", "pharmacist", and "nurse". As a matter of course, items other than the illustrated items may be included. On the right side of the staff category, columns of "clothing color" and "group classification" are shown in sequence.

The clothing color (color tone) corresponding to each staff category item will be described below. The clothing color corresponding to "non-staff person" is "unspecified". That is, when the feature extraction unit 1171 detects a person from the image data and the clothing color of the detected person is not included in the preset colors, the feature extraction unit 1171 classifies the detected person as the "non-staff person". Further, according to the staff information 128, the group classification corresponding to the "non-staff person" is the first group.

The category is associated with the clothing color. For example, it is assumed that the color of staff uniform is determined for each category. In this case, the color of the uniform differs for each category. Therefore, the classifier 1172 can identify the category from the clothing color. As a matter of course, staff members in one category may wear uniforms of different colors. For example, a nurse may wear a white uniform (white coat) or a pink uniform. Alternatively, multiple categories of staff members may wear uniforms of a common color. For example, nurses and pharmacists may wear white uniforms. Furthermore, the shape of clothes, hats, etc., in addition to the clothing color may be used as features. The classifier 1172 then identifies the category that matches the feature of the person in the image. As a matter of course, when more than one person are included in the image, the classifier 1172 identifies the category of each person.

The classifier 1172 can easily and appropriately determine whether the person is a staff member by determining whether the person is a staff member based on the clothing color. For example, even when a new staff member is added, it is possible to determine whether the staff member is a staff member without using the staff member's information. Alternatively, the classifier 1172 may classify whether the person is a non-staff person or a staff member in accordance with the presence or absence of predetermined belongings such as a name tag, ID card, entry card, or the like. For example, the classifier 1172 classifies a person with a name tag attached to a predetermined portion of the clothes as a staff member. Alternatively, the classifier 1172 classifies a person whose ID card or entry card is hung from the neck in a card holder or the like as a staff member.

Additionally, the classifier 1172 may perform classification based on features of the facial image. For example, the staff information 128 may store facial images of staff members or feature amounts thereof in advance. When the facial features of a person included in the image captured by the environmental camera 300 can be extracted, it is possible to determine whether the person is a staff member by comparing the feature amounts of the facial images. Further, when the staff category is registered in advance, the staff member can be specified from the feature amount of the facial image. As a matter of course, the classifier 1172 can combine multiple features to perform the classification.

As described above, the classifier 1172 determines whether the person in the image is a staff member. The classifier 1172 classifies the staff member into the second group. The classifier 1172 classifies the non-staff person into the first group. That is, the classifier 1172 classifies the person other than the staff member into the first group. In other words, the classifier 1172 classifies a person who cannot be identified as a staff member into the first group. Note that, although it is preferable that the staff members be registered in advance, a new staff member may be classified in accordance with the clothing color.

The classifier 1172 can include a machine learned model generated by machine learning, as exemplified by the first learned model 1172*a* and the second learned model 1172*b*. In this case, machine learning can be performed using images captured for each staff category as training data. That is, a machine learning model with high classification accuracy can be constructed by performing supervised learning using the image data to which staff categories are attached as correct labels as training data. In other words, it is possible to use captured images of staff members wearing predetermined uniforms as learning data.

The machine learning model can also be provided in the mode control unit 117 as a model for performing the feature extraction by the feature extraction unit 1171 and executing the classification process by the classifier 1172. In this case, by inputting an image including a person to the machine learning model, the machine learning model outputs the classification result. Further, a machine learning model corresponding to the features to be classified may be used. For example, a machine learning model for classification based on the clothing colors and a machine learning model for classification based on the feature amounts of facial image may be used independently of each other. Then, when any one of the machine learning models recognizes the person as a staff member, the classifier 1172 determines that the person belongs to the second group. When the person cannot be identified as a staff member, the classifier 1172 determines that the person belongs to the first group.

Mode Information

Next, FIG. 6 shows an example of the mode information 129. FIG. 6 is a table showing an example of the mode information 129. FIG. 6 shows an example of a difference in processing between the non-staff mode and the staff mode. In FIG. 6, as items to be subjected to the mode control, items of cameras that serve as information sources of the image data used for group classification and items of learned models used for the group classification process are shown. The switching unit 1174 can switch the items shown in FIG. 6 in accordance with the mode indicated by the selection result of the selection unit 1173. As a matter of course, as described for the mode control unit 117, other types of items that vary the control depending on the mode can also be included.

As shown in the camera item, the switching unit 1174 can use all the environmental cameras 300 and the cameras 25 as the information sources when in the non-staff mode, and can use only the environmental cameras 300 as the information sources when in the staff mode. The switching unit 1174 can switch ON/OFF of the power supply or sleep of the cameras 25, and such an example will be given. However, other methods, for example, a method in which the switching unit 1174 switches ON/OFF of use of the image data captured by the cameras 25 and transmitted from the mobile robot 20 in the group classification process can be adopted so as to handle the case where the cameras 25 are used for purposes other than determination of a person.

In the staff mode, each camera 25 is turned off or in a sleep state. In the non-staff mode, the camera 25 operates without sleeping or being turned off. That is, the switching unit 1174 outputs a control signal for switching ON/OFF of the power supply or sleep of the camera 25 in accordance with the mode. In the staff mode, the cameras 25 are turned off or put to sleep, whereby the processing load is reduced and the power consumption can thus be reduced.

Further, the switching unit 1174 can switch the number of pixels of the camera by adding an item of camera resolution (pixels) to the mode information 129. In the staff mode, any one of the image data acquisition unit 1170, the feature extraction unit 1171, and the classifier 1172 executes a thinning process such that each environmental camera 300 outputs a captured image with a low number of pixels, or the number of pixels of the captured image used as the information source has a small number of pixels. In the non-staff mode, any one of the image data acquisition unit 1170, the feature extraction unit 1171, and the classifier 1172 executes a process using the captured image having a large number of pixels output by or used as the information source by the environmental cameras 300 and the cameras 25.

Further, in addition to or instead of the camera pixel item, a frame rate item may be provided, and the switching unit 1174 may switch the camera frame rate in accordance with the mode. In the staff mode, the environmental cameras 300 capture images at a low frame rate. In the non-staff mode, the environmental cameras 300 and the camera 25 capture images at a high frame rate. That is, the switching unit 1174 outputs a control signal for switching the frame rate of the image captured by the camera in accordance with the mode. The images are captured at a high frame rate, and therefore the processing load on the processor or the like becomes higher than that when the frame rate is low. Further, items other than the camera pixels and the frame rate can also be added as appropriate to reduce the power consumption by reducing the processing load. Note that, items other than the item of the camera as the information source, such as the camera pixels and the frame rate, can be used even when the items of the camera as the information source are not provided. In that case, the same camera can be used as the information source regardless of whether the mode is the staff mode or the non-staff mode.

Further, as shown in the item of the learned model, the switching unit 1174 can use the first learned model 1172a when in the non-staff mode, and can use the second learned model 1172b when in the staff mode.

Example of Control Method

Figure 7:
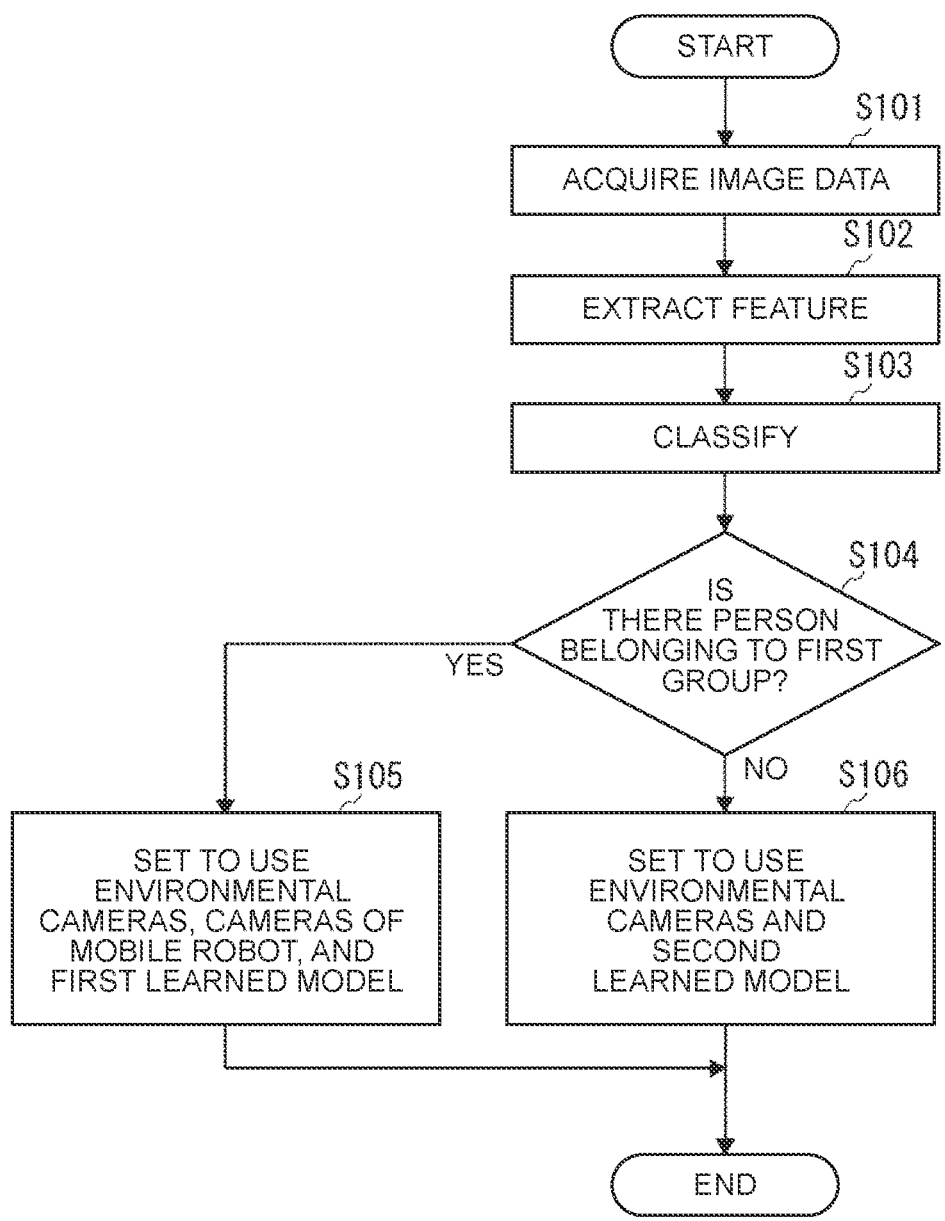
FIG. 7 is a flowchart showing an example of a control method according to the present embodiment.

FIG. 7 is a flowchart showing an example of the control method according to the present embodiment. In FIG. 7, only one example of the control method based on FIG. 6 will be described for simplification of description. First, the image data acquisition unit 1170 acquires image data from the environmental cameras 300 and the cameras 25 (S101). Note that, the description here starts from the state of the non-staff mode. That is, when the environmental cameras 300 or the environmental cameras 300 and the cameras 25 capture images of the monitoring area, the captured images are transmitted to the host management device 10. The image data may be moving images or still images. Furthermore, the image data may be data obtained by subjecting the captured images to various types of processing.

Next, the feature extraction unit 1171 extracts the features of the person in the captured images (S102). Here, the feature extraction unit 1171 detects people included in the captured images and extracts features for each person. For example, the feature extraction unit 1171 extracts the clothing color of the person as a feature. As a matter of course, the feature extraction unit 1171 may extract the feature amount for face recognition and the shape of the clothes, in addition to the clothing color. The feature extraction unit 1171 may extract the presence or absence of a nurse cap, the presence or absence of a name tag, the presence or absence of an ID card, etc. as features.

The classifier 1172 uses the first learned model 1172a to classify the person included in the captured image into the first group or the second group based on the person's features (S103). The classifier 1172 refers to the staff information and determines whether the person belongs to the second group (staff member) based on the features of each person. Specifically, the classifier 1172 determines that the person belongs to the second group when the clothing color matches the preset color of the uniform. Accordingly, all persons included in the captured images are classified into the first group or the second group. As a matter of course, the classifier 1172 can perform classification using other features, in addition to the feature of clothing color.

Then, the classifier 1172 determines whether a person belonging to the first group is present within the monitoring area (S104). When the person (non-staff person) belonging to the first group is present (YES in S104), the selection unit 1173 selects the non-staff mode with a high processing load, and the switching unit 1174 executes control to use the environmental cameras 300, the cameras 25, and the first learned model 1172*a* in accordance with the selection result (S105). Since this is an example of starting from the non-staff mode, no mode switching is performed in S105.

When the person belonging to the first group is not present (NO in S104), the selection unit 1173 selects the staff mode with a low processing load, and the switching unit 1174 executes control to use the environmental cameras 300 and the second learned model 1172*b* in accordance with the selection result (S106). Here, since this is an example of starting from the non-staff mode, mode switching is performed in S106.

Although the example of starting from the non-staff mode has been described, in the process starting from the staff mode, the environmental cameras 300 are used in S101, mode switching is performed in S105, and mode switching is not performed in S106.

Figure 8:
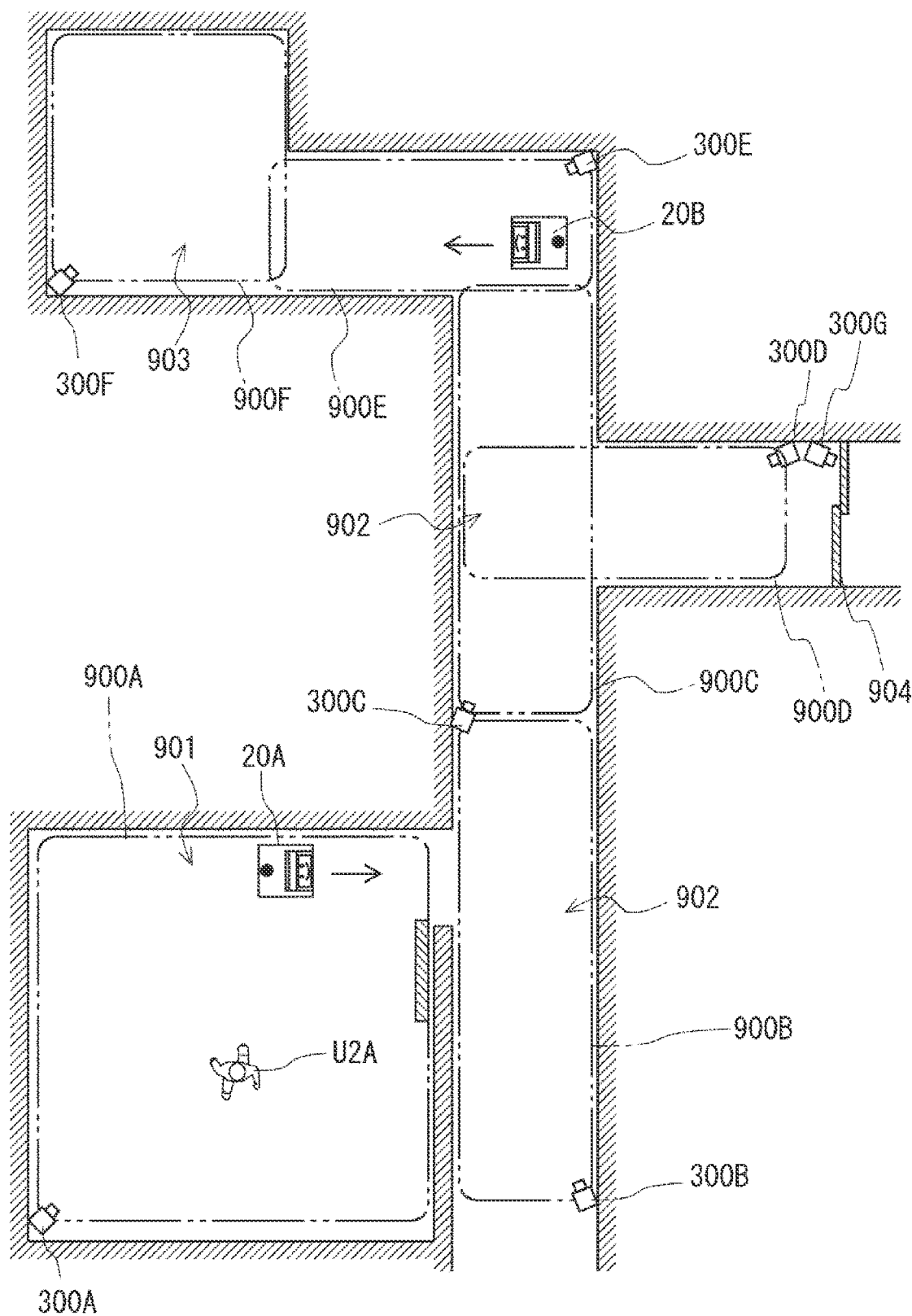
FIG. 8 is a diagram for illustrating an example of mode control.
Figure 9:
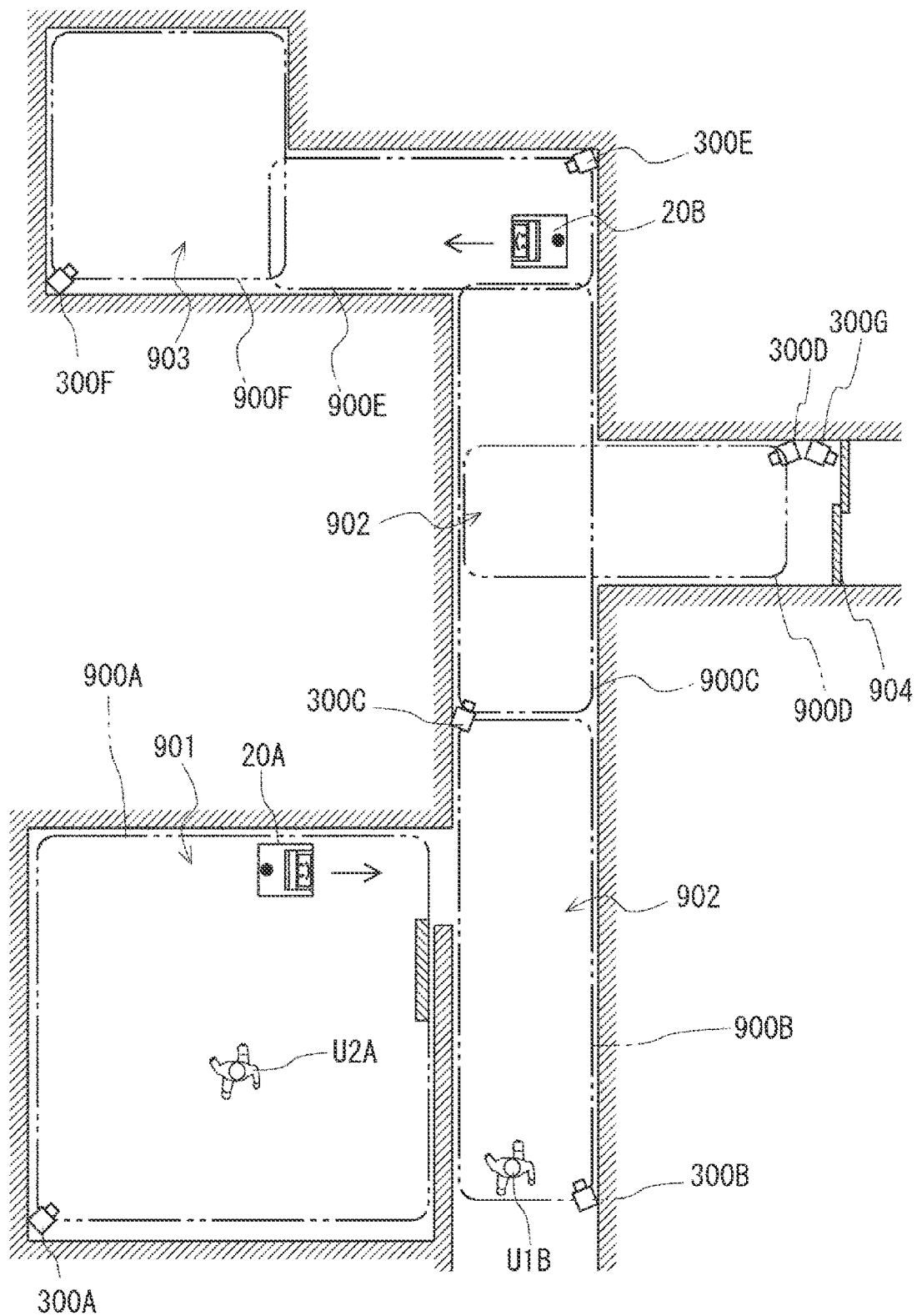
FIG. 9 is a diagram for illustrating an example of the mode control.

FIGS. 8 and 9 are diagrams for illustrating a specific example of mode switching. FIGS. 8 and 9 are schematic diagrams of the floor on which the mobile robot 20 moves, as viewed from above. A room 901, a room 903, and a passage 902 are provided in the facility. The passage 902 connects the room 901 and the room 903. In FIG. 8, seven environmental cameras 300 are identified as environmental cameras 300A to 300G. The environmental cameras 300A to 300G are installed at different positions and in different directions. The environmental cameras 300A to 300G capture images of different areas, and the environmental camera 300G is disposed at a position where it is possible to confirm the entry and exit of a person at an entrance 904 functioning as a security gate. The positions, imaging directions, imaging ranges, and the like of the environmental cameras 300A to 300F may be registered in the floor map 121 in advance.

The areas assigned to the environmental cameras 300A to 300F are defined as monitoring areas 900A to 900F, respectively. For example, the environmental camera 300A captures an image of the monitoring area 900A, and the environmental camera 300B captures an image of the monitoring area 900B. Similarly, the environmental cameras 300C, 300D, 300E, and 300F capture images of the monitoring areas 900C, 900D, 900E, and 900F, respectively. The environmental camera 300G images the range of the entrance 904. As described above, the environmental cameras 300A to 300G are installed in the target facility. The facility is divided into multiple monitoring areas. Information on the monitoring areas may be registered in the floor map 121 in advance.

As shown in FIG. 8, when there is only a staff member U2A, the selection unit 1173 selects the staff mode with a low processing load, and the switching unit 1174 executes control to use the environmental cameras 300 and the second learned model 1172*b* in accordance with the selection result.

On the other hand, as shown in FIG. 9, when a non-staff person U1B in the facility (regardless of the presence of a staff member), the selection unit 1173 selects the non-staff mode with a high processing load, and the switching unit 1174 executes control to use the environmental cameras 300, the cameras 25, and the first learned model 1172*a* in accordance with the selection result.

Although the present embodiment has been described above, the control method according to the present embodiment may be executed by the host management device 10 or may be performed by an edge device. The edge device includes, for example, one or more of the environmental camera 300, the mobile robot 20, the communication unit 610, and the user terminal 400. Further, the environmental camera 300, the mobile robot 20, and the host management device 10 may work together to execute the control method. That is, the control system according to the present embodiment may be installed in the environmental camera 300 and the mobile robot 20. Alternatively, at least part of the control system or the entire control system may be installed in a device other than the mobile robot 20, such as the host management device 10. The host management device 10 is not limited to being physically a single device, but may be distributed among a plurality of devices. That is, the host management device 10 may include multiple memories and multiple processors.

Alternative Example

The transport system 1, the host management device 10, the mobile robot 20, the user terminal 400, the environmental cameras 300, and the communication unit 610 according to the above-described embodiment are not limited to those having the illustrated shape and executing illustrated control, and it is sufficient as long as the function of each device can be fulfilled. Further, in the above-described embodiment, an example in which the control system is incorporated into the transport system has been described. However, the control system may not be incorporated into the transport system.

In the above-described embodiment, the example in which the first group and the second group are classified, and the mode is switched between the first operation mode and the second operation mode has been shown. However, the classification can be performed by classifying people into three or more groups, and switching can be performed among three or more operation modes depending on whether at least any one or more of the classified groups are included. Each operation mode in this case can be a mode in which the processing load is reduced step by step in accordance with a low degree of necessity of monitoring, as in the example described in the case of using two groups.

Figure 10:
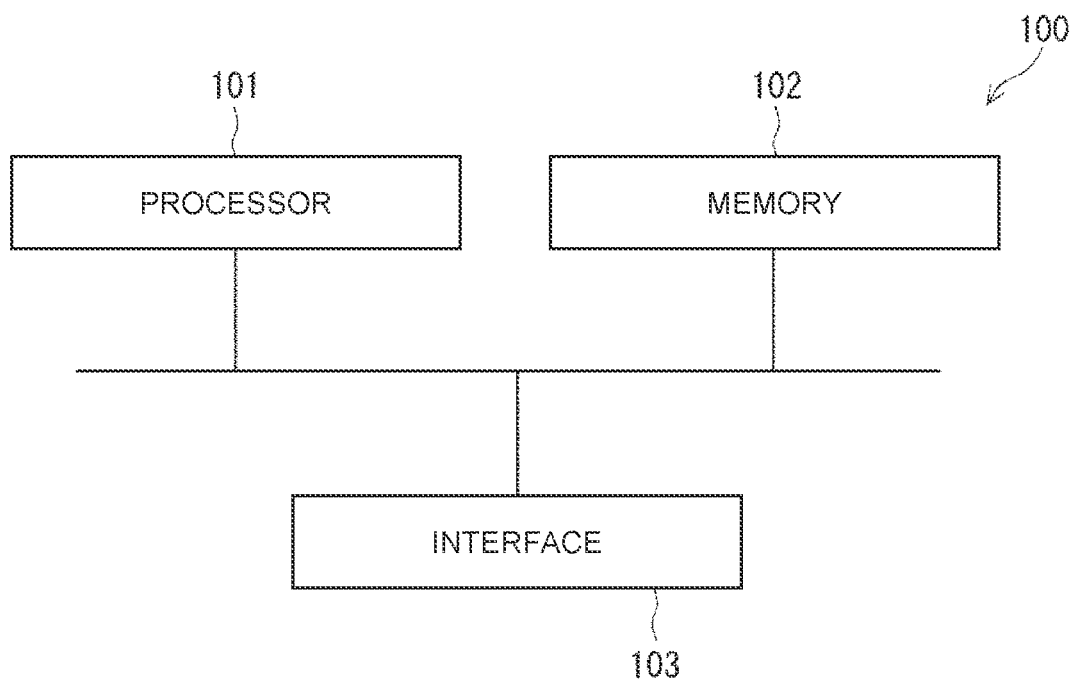
FIG. 10 is a diagram showing an example of a hardware configuration of a device.

Further, each device provided in the transport system 1 and each device provided in the control system according to the above-described embodiment can have the following hardware configuration, for example. FIG. 10 is a diagram showing an example of the hardware configuration of the device.

A device 100 shown in FIG. 10 can include a processor 101, a memory 102, and an interface 103. The interface 103 can include, for example, a communication interface, an interface with a drive unit, a sensor, an input and output device, and the like.

The processor 101 may be, for example, a CPU, a graphics processing unit (GPU), microprocessor, a microprocessor unit (MPU) that is also referred to as a microprocessor, and the like. The processor 101 may include a plurality of processors. The processor 101 can also include, for example, a low power consumption processor used in the second operation mode and a high power consumption processor used in the first operation mode. The memory 102 is composed of, for example, a combination of a volatile memory and a non-volatile memory. The functions of each device are realized in a manner such that the processor 101 reads a program stored in the memory 102 and executes the program while exchanging information via the interface 103. That is, part of or all of the processes in the host management device 10, the environmental cameras 300, the mobile robot 20, and the like described above can be realized as a computer program.

The program described above includes a set of instructions (or software code) for causing the computer to perform one or more of the functions described in the embodiments when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD) or other memory technologies, a compact disc read-only memory (CD-ROM), a digital versatile disc (DVD), a Blu-ray (registered trademark) disc or other optical disc storages, a magnetic cassette, a magnetic tape, a magnetic disc storage, or other magnetic storage devices. The program may be transmitted on a transitory computer-readable medium or a communication medium. The example of the transitory computer-readable medium or the communication medium includes, but is not limited to, an electrical, optical, acoustic, or other form of propagating signal.

The present disclosure is not limited to the above embodiments, and can be appropriately modified without departing from the spirit.

What is claimed is:

1. A control system, wherein:
   the control system
   executes system control that controls a system including a mobile robot that autonomously moves, and
   executes a group classification process of recognizing a feature of a person present around the mobile robot and classifying, based on the feature, the person into a non-staff group or a staff group; and
   the system control
   selects a non-staff operation mode when the person belonging to the non-staff group is present around the mobile robot and selects a staff operation mode that is different from the non-staff operation mode when the person belonging to the non-staff group is not present around the mobile robot,
   controls, in response to the staff operation mode being selected, the group classification process so as to perform classification with a second learned model constructed to be a lightweight model having a smaller processing load by reducing at least one of a number of pieces of feature information or a number of pixels of an image as input parameters and a number of intermediate layers, as compared to a larger processing load of a first learned model, wherein the larger processing load is larger than the smaller processing load, and
   controls, in response to the non-staff operation mode being selected, the group classification process to perform classification with the first learned model having the larger processing load that is larger than the smaller processing load of the second learned model.

2. The control system according to claim 1, wherein when the staff operation mode is selected, the system control controls the group classification process so as to lower at least one of a processing accuracy and a usage ratio of a processing device to be used in the group classification process as compared with when the non-staff operation mode is selected.

3. The control system according to claim 2, comprising a camera that captures an image of surroundings of the mobile robot and generates moving image data as one of the processing devices, wherein:
   the group classification process recognizes the feature of the person from the moving image data generated by the camera; and
   the system control controls the group classification process so as to lower at least one of a frame rate and resolution of the camera when the staff operation mode is selected as compared with when the non-staff operation mode is selected.

4. The control system according to claim 3, wherein the camera is provided at a position spaced apart from a traveling surface of the mobile robot so as to capture the image of the surroundings of the mobile robot that is traveling.

5. The control system according to claim 1, wherein the group classification process classifies the person in accordance with a feature of clothing of the person or in accordance with whether the person possesses a predetermined belonging.

6. The control system according to claim 1, wherein the system control varies movement control of the mobile robot depending on which one of the non-staff operation mode and the staff operation mode is selected.

7. A control method comprising:
   executing system control that controls a system including a mobile robot that autonomously moves; and
   executing a group classification process of recognizing a feature of a person present around the mobile robot and classifying, based on the feature, the person into a non-staff group or a staff group, wherein
   the system control
   selects a non-staff operation mode when the person belonging to the non-staff group is present around the mobile robot and selects a staff operation mode that is different from the non-staff operation mode when the person belonging to the non-staff group is not present around the mobile robot,
   controls, in response to the staff operation mode being selected, the group classification process so as to perform classification with a second learned model constructed to be a lightweight model having a smaller processing load by reducing at least one of a number of pieces of feature information or a number of pixels of an image as input parameters and a number of intermediate layers, as compared to a larger processing load of a first learned model, wherein the larger processing load is larger than the smaller processing load, and
   controls, in response to the non-staff operation mode being selected, the group classification process to perform classification with the first learned model having the larger processing load that is larger than the smaller processing load of the second learned model.

8. The control method according to claim 7, wherein when the staff operation mode is selected, the system control controls the group classification process so as to lower at least one of a processing accuracy and a usage ratio of a processing device to be used in the group classification process as compared with when the non-staff operation mode is selected.

9. The control method according to claim 8, wherein:
one of the processing devices is a camera that captures an image of surroundings of the mobile robot and generates moving image data;
the group classification process recognizes the feature of the person from the moving image data generated by the camera; and
the system control controls the group classification process so as to lower at least one of a frame rate and resolution of the camera when the staff operation mode is selected as compared with when the non-staff operation mode is selected.

10. The control method according to claim 9, wherein the camera is provided at a position spaced apart from a traveling surface of the mobile robot so as to capture the image of the surroundings of the mobile robot that is traveling.

11. The control method according to claim 7, wherein the group classification process classifies the person in accordance with a feature of clothing of the person or in accordance with whether the person possesses a predetermined belonging.

12. The control method according to claim 7, wherein the system control varies movement control of the mobile robot depending on which one of the non-staff operation mode and the staff operation mode is selected.

13. A non-transitory storage medium storing a program causing a computer to execute a control method, wherein:
the control method
executes system control that controls a system including a mobile robot that autonomously moves, and
executes a group classification process of recognizing a feature of a person present around the mobile robot and classifying, based on the feature, the person into a non-staff group or a staff group; and
the system control
selects a non-staff operation mode when the person belonging to the non-staff group is present around the mobile robot and selects a staff operation mode that is different from the non-staff operation mode when the person belonging to the non-staff group is not present around the mobile robot, and
controls, in response to the staff operation mode being selected, the group classification process so as to perform classification with a second learned model constructed to be a lightweight model having a smaller processing load by reducing at least one of a number of pieces of feature information or a number of pixels of an image as input parameters and a number of intermediate layers, as compared to a larger processing load of a first learned model, wherein the larger processing load is larger than the smaller processing load, and
controls, in response to the non-staff operation mode being selected, the group classification process to perform classification with the first learned model having the larger processing load that is larger than the smaller processing load of the second learned model.

14. The storage medium according to claim 13, wherein when the staff operation mode is selected, the system control controls the group classification process so as to lower at least one of a processing accuracy and a usage ratio of a processing device to be used in the group classification process as compared with when the non-staff operation mode is selected.

15. The storage medium according to claim 14, wherein:
one of the processing devices is a camera that captures an image of surroundings of the mobile robot and generates moving image data;
the group classification process recognizes the feature of the person from the moving image data generated by the camera; and
the system control controls the group classification process so as to lower at least one of a frame rate and resolution of the camera when the staff operation mode is selected as compared with when the non-staff operation mode is selected.

16. The storage medium according to claim 15, wherein the camera is provided at a position spaced apart from a traveling surface of the mobile robot so as to capture the image of the surroundings of the mobile robot that is traveling.

17. The storage medium according to claim 13, wherein the group classification process classifies the person in accordance with a feature of clothing of the person or in accordance with whether the person possesses a predetermined belonging.

* * * * *